(12) United States Patent
Kato et al.

(10) Patent No.: US 6,612,272 B2
(45) Date of Patent: Sep. 2, 2003

(54) COOLING ARRANGEMENT FOR DIRECT INJECTED ENGINE

(75) Inventors: Masahiko Kato, Shizuoka (JP); Takayuki Sato, Shizuoka (JP); Hiroaki Fujimoto, Shizuoka (JP)

(73) Assignee: Yamaha Marine Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 09/968,710

(22) Filed: Oct. 1, 2001

(65) Prior Publication Data

US 2002/0083906 A1 Jul. 4, 2002

Related U.S. Application Data

(62) Division of application No. 08/277,231, filed on Mar. 26, 1999, now Pat. No. 6,295,955.

(30) Foreign Application Priority Data

Mar. 26, 1998 (JP) .............................. 10-79459

(51) Int. Cl.$^7$ ................................. F02F 1/36
(52) U.S. Cl. ................ 123/41.82 R; 123/464
(58) Field of Search .................. 123/41.82 R, 41.31, 123/193.5, 195 HC, 73 C; 128/478, 480, 464; 701/103, 104

(56) References Cited

U.S. PATENT DOCUMENTS

| 4,545,332 A | 10/1985 | Suzuki et al. |
|---|---|---|
| 4,588,385 A | 5/1986 | Suzuki et al. |
| 4,972,807 A | 11/1990 | Morishita |
| 5,036,804 A | 8/1991 | Shibata |
| 5,081,960 A | 1/1992 | Shimamoto |
| 5,094,193 A | 3/1992 | Yoshikawa |
| 5,095,704 A | 3/1992 | Nagura et al. |
| 5,113,807 A | 5/1992 | Kobayashi |
| RE34,226 E | 4/1993 | Morishita |
| 5,222,464 A | 6/1993 | Oyaizu |
| 5,379,729 A | 1/1995 | Yonezwa et al. |
| 5,385,125 A | 1/1995 | Oyaizu et al. |
| 5,529,038 A | 6/1996 | Tsuchida |
| 5,555,858 A | 9/1996 | Katoh |
| 5,575,245 A | 11/1996 | Watanabe |
| 5,586,524 A | 12/1996 | Nonaka et al. |
| 5,613,480 A | 3/1997 | Katoh et al. |
| 5,655,500 A | 8/1997 | Kato |

(List continued on next page.)

Primary Examiner—John Kwon
(74) Attorney, Agent, or Firm—Knobbe, Martens, Olson & Bear, LLP.

(57) ABSTRACT

Cooling arrangements that cool down fuel injectors exposed to the high temperature combustion in direct injected engines so that no heavy oil components deposit on nozzles of the fuel injectors. A bypass of water flow extends in the proximity of the boss where the fuel injector is inserted to expedite cooling of the fuel injector. A cavity extending toward the boss can replace the bypass or can be additionally provided. The fuel injector boss and a spark plug boss are connected with each other and make a wall that can obstruct water flow. Another bypass is provided to clear water away from a backwater formed at the wall. In case that some heavy oil components deposit on the injector nozzles for some reasons, a control system for controlling the fuel injection is allowed to adjust amounts of the fuel basically in response to the temperature of the injector nozzle.

6 Claims, 16 Drawing Sheets

U.S. PATENT DOCUMENTS

| | | |
|---|---|---|
| 5,697,353 A | 12/1997 | Katoh et al. |
| 5,713,325 A | 2/1998 | Yoshida et al. |
| 5,722,363 A | 3/1998 | Iida et al. |
| 5,799,638 A | 9/1998 | Tsuchida et al. |
| 5,803,023 A | 9/1998 | Takahashi et al. |
| 5,803,036 A | 9/1998 | Takahashi et al. |
| 5,873,330 A | 2/1999 | Takahashi et al. |
| 5,890,461 A | 4/1999 | Iikura |
| 5,908,018 A | 6/1999 | Suzuki |
| 5,915,349 A | 6/1999 | Biemelt et al. |
| 5,918,584 A | 7/1999 | Kato |
| 5,983,843 A | 11/1999 | Suzuki et al. |
| 5,983,853 A | 11/1999 | Roessler et al. |
| 6,067,956 A | 5/2000 | Motose et al. |
| 6,125,624 A * | 10/2000 | Prociw .................... 60/39.094 |
| 6,148,800 A * | 11/2000 | Cari et al. ................... 123/490 |
| 6,247,441 B1 * | 6/2001 | Sato et al. .............. 123/198 D |
| 6,295,955 B1 * | 10/2001 | Kato et al. ............ 123/41.82 R |
| 6,295,956 B1 * | 10/2001 | Kato et al. ............... 123/41.79 |
| 6,367,450 B1 * | 4/2002 | Kato .................... 123/406.26 |
| 6,401,698 B1 * | 6/2002 | Yamazaki et al. .......... 123/529 |

\* cited by examiner

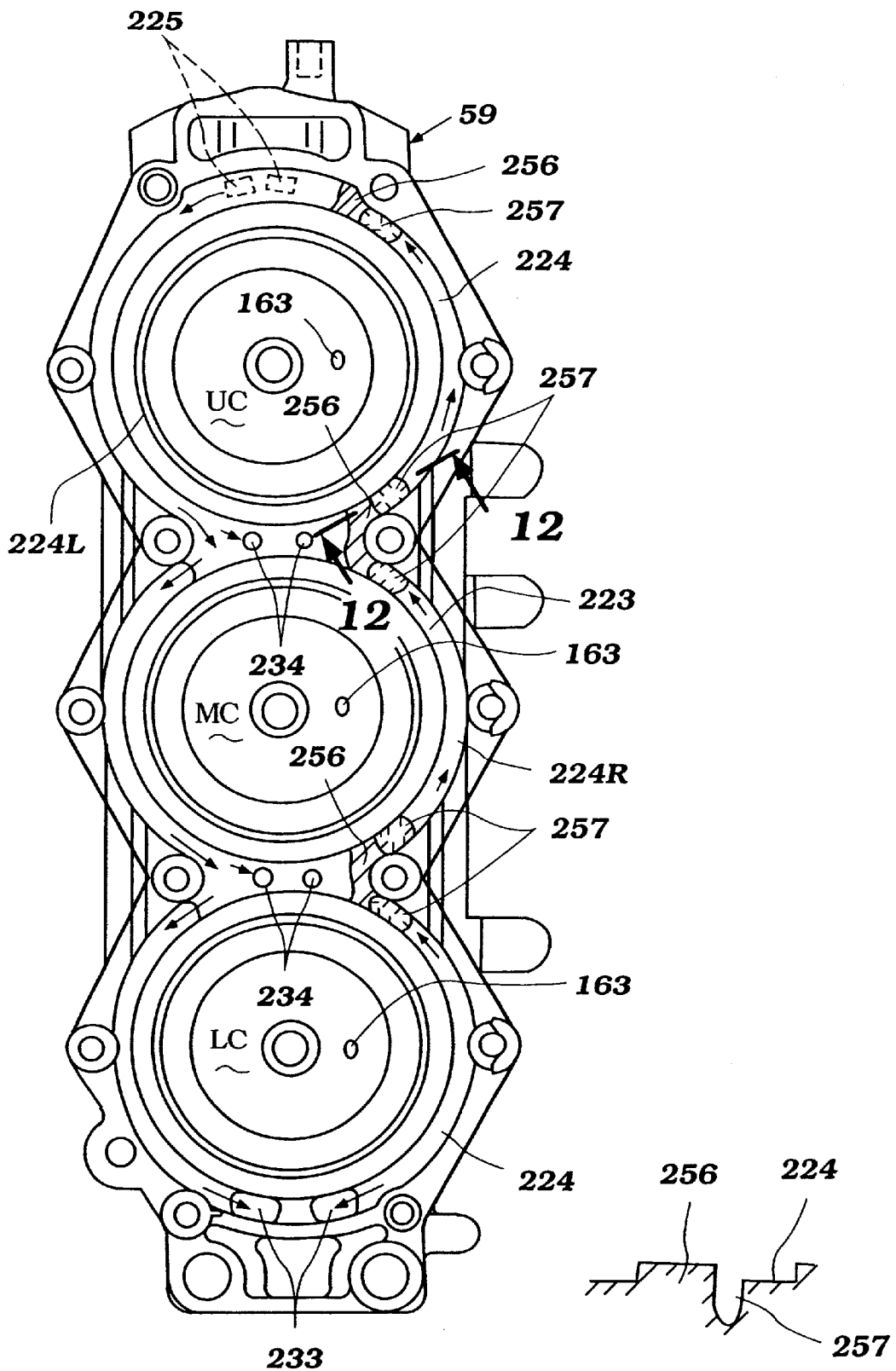
*Figure 11*  *Figure 12*

COOLING ARRANGEMENT FOR DIRECT INJECTED ENGINE

PRIORITY INFORMATION

This application is a divisional application of U.S. patent application Ser. No. 08/277,231 filed Mar. 26, 1999, the entire contents of which is hereby expressly incorporated by reference and also claims priority to Japanese Patent Application No. 10-79459, filed Mar. 26, 1998, the entire contents of which is hereby expressly incorporated by reference.

BACKGROUND OF THE INVENTION

1. Field of the Invention

This invention relates to a cooling arrangement for direct injected engines and more particularly to an improved cooling arrangement for fuel injectors that spray fuel directly into combustion chambers.

2. Description of Related Art

As is well known, in all fields of engine design, there is an increasing emphasis on obtaining more effective emission control, better fuel economy and, at the same time, continued high or higher power output. This trend has resulted in the substitution of fuel injection systems for carburetors as the engine charge former. In the common systems used, fuel is injected into an intake air manifold. In order to obtain still further improvement, direct injection systems are being considered. These systems inject fuel directly into the combustion chamber and thus have significant potential advantages.

With direct injection systems, however, since the fuel must be injected directly into the combustion chamber, a nozzle of the fuel injector is exposed to the combustion chamber in which the injected fuel burns at an extremely high temperature. Although cooled with the injected fuel per se before every combustion, the injector nozzle retains considerable heat therein with the repeated combustions.

It is, therefore, a principal object of this invention to provide a cooling arrangement that is allowed to keep an injector nozzle under the evaporation temperature so as to ensure correct controls and improve emission control.

The aforenoted problems are likely to occur particularly in conjunction with engines in which a plurality of cylinder bodies extend vertically. In those engines, cooling water flows generally upwardly and downwardly and backwaters or pools can be formed in the water flow due to the gravity. Outboard motors usually accommodate such engines.

It is, therefore, another object of this invention to provide an improved cooling arrangement that is applicable to this kind of engines.

Meanwhile, a certain amount, although it is small, of the liquid fuel that contains heavy oil components exists on the injector nozzle immediately after injection. When the heat in the injector nozzle exceeds the evaporation temperature of the liquid fuel (for example, 90% of gasoline components evaporate at 150° C. to 170° C.), the heavy oil components tend to deposit on the injector nozzle. Excessive depositions of the heavy oil components on the injector nozzle invite deformations of the injection shape and fluctuations in the amounts of injected fuel and then give rise to incorrect controls and difficulties in control of emissions. The injector nozzle exposed to the combustion flame reaches the evaporation temperature without delay after start up of the engine.

Notwithstanding the improved cooling arrangements, it is more effective to ensure correct controls and easiness in control of emissions in case that heavy oil components in the liquid fuel deposit on the injector nozzle due to some reasons. For example, the cooling water may be precluded from flowing smoothly due to an impermanent malfunction of a water pump.

It is, therefore, a further object of this invention to provide an improved control system that can adjust amounts of the fuel so that the appropriate fuel amount that match the engine's requirement is injected at every injection.

In this regard, it is found out that the drop rate of injection amounts decreases with a lapse of time and then settles a constant value. How the injection amounts decrease and the constant value depend on the temperature of the injector nozzle. Accordingly, it is one idea to use a temperature sensor and the relationship of time versus temperature to control the injection amount. However, the temperature sensor is somewhat costly. In addition, it requires to be attached to the injector nozzle per se. This can cause, however, another problem in securing the attachment because the fuel injector is detachable.

It is, therefore, a still further object of this invention to provide another improved control system that is not costly and requires no complicated arrangement.

SUMMARY OF THE INVENTION

This invention is adapted to be embodied in a direct cylinder injected, internal combustion engine. A cylinder body is provided and defines at least one cylinder bore in which a piston reciprocates. A cylinder head is affixed to an end of the cylinder body for closing the cylinder bore and defines with the piston and the cylinder bore a combustion chamber. A fuel injector having a nozzle is provided for spraying fuel directly into the combustion chamber for combustion. At least one of the cylinder body and the cylinder head is provided with a cooling jacket therein. The fuel injector is inserted into a boss formed on the cylinder head so that the nozzle of the fuel injector is exposed to the combustion chamber. A water passage is formed in said cylinder head. At least a part of said boss is placed in the cooling water passage. The cooling jacket and the cooling water passage are connected with each other by means of a bypass.

In accordance with another aspect of this invention, a direct cylinder injected, internal combustion engine has a cylinder body defining at least one cylinder bore in which a piston reciprocates. A cylinder head is affixed to an end of said cylinder body for closing said cylinder bore and defining with said piston and said cylinder bore a combustion chamber. A fuel injector having a nozzle is provided for spraying fuel directly into the combustion chamber for combustion therein. At least one of said cylinder body and said cylinder head is provided with a cooling jacket therein. The fuel injector is inserted into a boss formed on said cylinder head so that the nozzle of said fuel injector is exposed to said combustion chamber. The cooling jacket is provided with a cavity.

In accordance with a further aspect of this invention, a direct cylinder injected, internal combustion engine has a cylinder body defining at least one cylinder bore in which a piston reciprocates. A cylinder head is affixed to an end of said cylinder body for closing said cylinder bore and defining with said piston and said cylinder bore a combustion chamber. A fuel injector is provided for spraying fuel directly into said combustion chamber for combustion therein. Means for sensing the temperature of said fuel injector is provided. A control system is provided for adjusting the amount of the fuel based upon the output from said temperature sensing means.

In accordance with still another aspect of this invention, a direct cylinder, internal combustion engine has a cylinder body defining at least one cylinder bore in which a piston reciprocates. A cylinder head is affixed to an end of said cylinder body for closing said cylinder bore and defining with said piston and said cylinder bore a combustion chamber. A fuel injector is provided for spraying fuel directly into said combustion chamber for combustion therein. Means for sequentially memorizing a plurality of amounts of the fuel corresponding to transitions of the temperature of said fuel injector is provided. Means for measuring a lapse of time is provided. A control system is provided for reading one of the memorized fuel amounts in sequence based upon the measured lapse of time and adjusting the fuel amount by adding the read out amount to the present amount.

BRIEF DESCRIPTION OF THE DRAWINGS

These and other features of this invention will now be described with reference to the drawings of preferred embodiments which are intended to illustrate and not to limit the invention.

FIG. 11 is a front elevational view showing a cylinder head configured in accordance with a second embodiment of the present invention taken through a portion of one of the cylinders in the second embodiment of this invention and shows in detail a cooling arrangement of the fuel injector as well as a fuel injection spray pattern relative to the scavenging air flow and the residual chart that are basically the same as shown in FIG. 6.

FIG. 12 is a cross-sectional view showing one part of the cylinder head and taken along the line 12—12 in FIG. 11.

DETAILED DESCRIPTION OF THE PREFERRED EMBODIMENTS OF THE INVENTION

The general overall environment in which the invention is practiced and certain details of the engines will be described primarily by reference to FIG. 1 and additionally to FIGS. 2 to 6.

Figure 1:
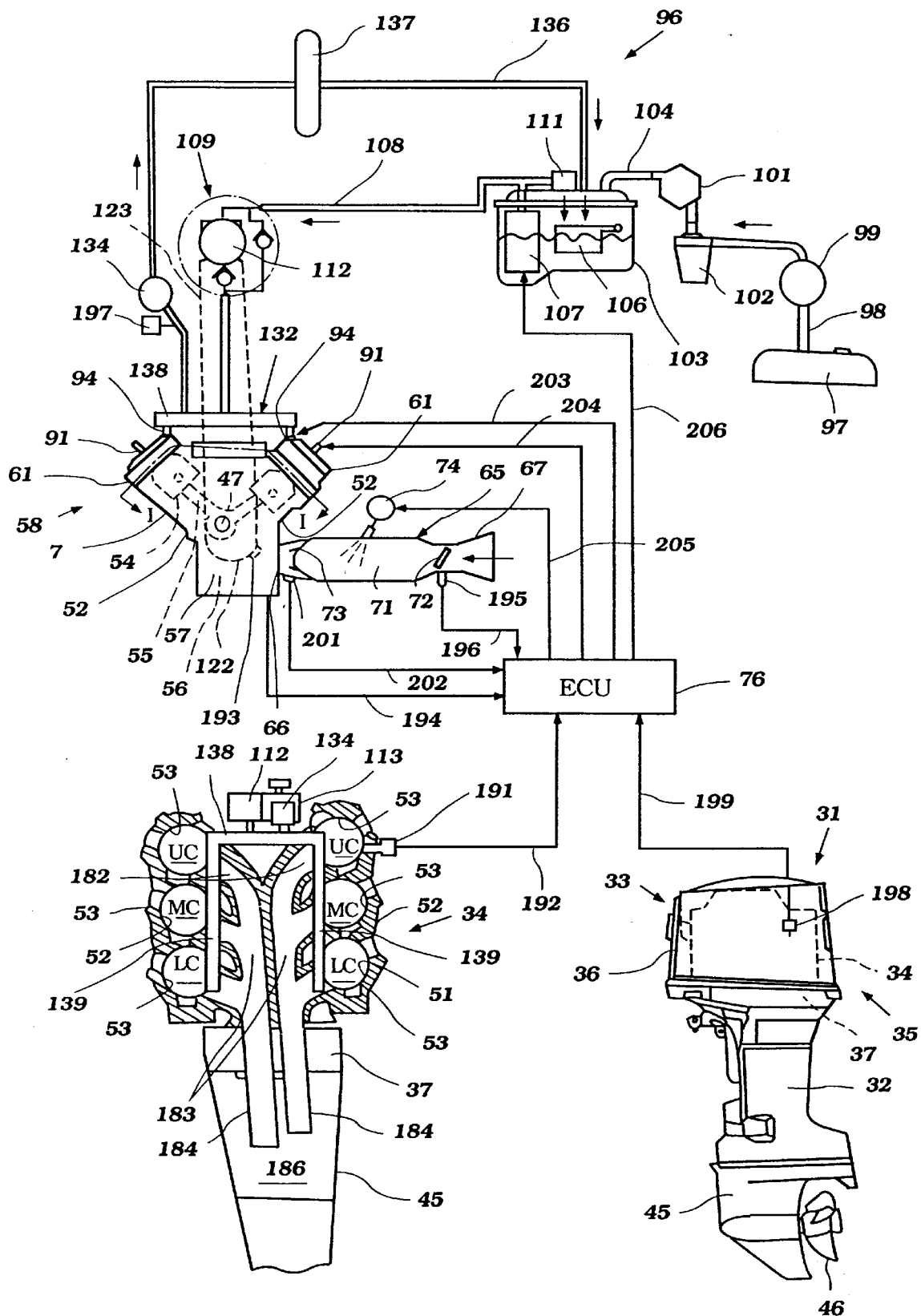
FIG. 1 is a multi-part view showing: in the lower right-hand portion, an outboard motor configured in accordance with a first embodiment of the present invention; in the upper view, a partially schematic cross-sectional view of the engine of the outboard motor with its induction and fuel injection system in part schematically; in the lower left-hand portion, a rear elevational view of the outboard motor with portions removed and other portions broken away and shown in section along the line 1—1 in the upper view so as to more clearly show the construction of the engine; and fuel injection system shown in part schematically. An ECU (Electric Control Unit) for the motor links the three views together.

In the lower-right hand view of the FIG. 1, an outboard motor constructed and operated in accordance with an embodiment of the invention is depicted in side elevational view and is identified generally by the reference numeral 31.

The entire outboard motor 31 is not depicted in that the swivel bracket and clamping bracket that are associated with the driveshaft housing, indicated generally by the reference numeral 32, are not illustrated. This is because these components are well known in the art and the specific method by which the outboard motor 31 is mounted to the transom of an associated watercraft is not necessary to permit those skilled in the art to understand or practice the invention.

The outboard motor 31 includes a power head, indicated generally by the reference numeral 33, that is positioned above the driveshaft housing 32 and which includes a powering internal combustion engine, indicated generally by the reference numeral 34. This engine 34 is shown in more detail in the remaining two views of this figure and will be described shortly by reference thereto.

The power head 33 is completed by a protective cowling 35 which includes a main cowling member 36. This main cowling member 36 is detachably connected to an exhaust guide 37 which is a lower tray portion of the protective cowling 36 and encircles an upper portion of the driveshaft housing 32.

Positioned beneath the driveshaft housing 32 is a lower unit 45 in which a propeller 46, which forms the propulsion device for the associated watercraft, is journaled.

As is typical with outboard motor practice, the engine 34 is supported in the power head 33 so that its crankshaft 47 (see the upper view) rotates about a vertically extending axis. This is done so as to facilitate the connection of the crankshaft 47 to a driveshaft (not shown) which depends into the driveshaft housing 32 and which drives the propeller 46 through a conventional forward, neutral, reverse transmission contained in the lower unit 45.

The details of the construction of the outboard motor and the components which are not illustrated may be considered to be conventional or of any type known to those wishing to utilize the invention disclosed herein. Those skilled in the art can readily refer to any known constructions with which to practice the invention.

Referring now in detail to the construction of the engine 34 still by primary reference to FIG. 1, in the illustrated embodiment, the engine 34 is of the V6 type and operates on a two stroke, crankcase compression principle. Although the invention is described in conjunction with an engine having this cylinder number and cylinder configuration, it will be readily apparent that the invention can be utilized with engines having other cylinder numbers and other cylinder configurations. Some features of the invention, however, have particular utility in connection with V-type engines.

Also, although the engine 34 will be described as operating on a two stroke principle, it will also be apparent to those skilled in the art that certain facets of the invention can be employed in conjunction with four stroke engines. In fact, some features of the invention also can be employed with rotary type engines.

The engine 34 is comprised of a cylinder block 51 that is formed with a pair of cylinder banks 52. Each of these cylinder banks 52 is formed with three vertically spaced, horizontally extending cylinder bores 53 (Cylinders are indicated as UC, MC and LC). Pistons 54 reciprocate in these cylinder bores 53. The pistons 54 are, in turn, connected to the upper or small ends of connecting rods 55. The big ends of these connecting rods are journaled on the throws of the crankshaft 47 in a manner that is well known in this art.

The crankshaft 47 is journaled in a suitable manner for rotation within a crankcase chamber 56 that is formed in part by a crankcase member 57 that is affixed to the cylinder block 51 in a suitable manner. As is typical with two cycle engines, the crankshaft 47 and crankcase chamber 56 are formed with seals so that each section of the crankcase that is associated with one of the cylinder bores 53 will be sealed from the others. This type of construction is well known in the art.

A cylinder head assembly, indicated generally by the reference numeral 58, is affixed to the end of the cylinder banks 52 that are spaced from the crankcase chamber 56. These cylinder head assemblies 58 are shown in more detail in FIG. 6 and are comprised of a main cylinder head member 59 that defines a plurality of recesses 60 in its lower face. Each of these recesses 60 corporate with the respective cylinder bore 53 and the head of the piston 54 to define the combustion chambers of the engine 34. When the pistons 54 are at their top dead center position, the cylinder head recesses 60 form the major portion of the combustion chamber. For that reason, the reference numeral 60 will be used, at times, to identify the combustion chamber per se.

A cylinder head cover member 61 completes the cylinder head assembly 58. The cylinder head members 59 and 61 are affixed to each other and to the respective cylinder banks 52 in a suitable, known manner.

Referring again primarily to FIG. 1, the air induction system, indicated generally by the reference numeral 65 is provided for delivering an air charge to the sections of the crankcase chamber 56 associated with each of the cylinder bores 53. This communication is via an intake port 66 formed in the crankcase member 56 and registering with each such crankcase chamber section.

The induction system 65 includes an air silencing and inlet device, shown schematically in this figure and indicated by the reference numeral 67. The actual construction of this air charge device appears in FIG. 2. In actual physical location, this device 67 is contained within the cowling 36 at the forward end thereof and has a rearwardly facing air inlet opening 68 through which air is introduced. Air is admitted into the interior or the cowling 36 in a known manner, and this is primarily through a pair of rearwardly positioned air inlet openings that have a construction as is generally well known in the art.

Referring again back to FIG. 1, the air inlet device 67 supplies the induced air to a plurality of throttle bodies or induction manifolds 71, each of which has a throttle valve 72 provided therein. These throttle valves 72 are supported on throttle valve shafts (not shown). These throttle valve shafts are linked to each other for simultaneous opening and closing of the throttle valves 72 in a manner that is well known in this art.

As is also typical in two cycle engine practice, the intake ports 66 have, provided in them, reed-type check valves 73. These check valves 73 permit the air to flow into the sections of the crankcase chamber 56 when the pistons 54 are moving upwardly in their respective cylinder bores 53. However, as the pistons 54 move downwardly, the charge will be compressed in the sections of the crankcase chamber 56. At that time, the reed type check valve 73 will close so as to permit the charge to be compressed. In addition, a lubricant pump 74 is provided for spraying lubricant into the throttle body 71 for engine lubrication under the control of an ECU (Electronic Control Unit), shown schematically in FIG. 1 and identified by the reference numeral 76. This ECU 76 will be described more in detail later. Although it is not shown, some forms of direct lubrication may be also employed for delivering lubricant directly to certain components of the engine.

Figure 6:
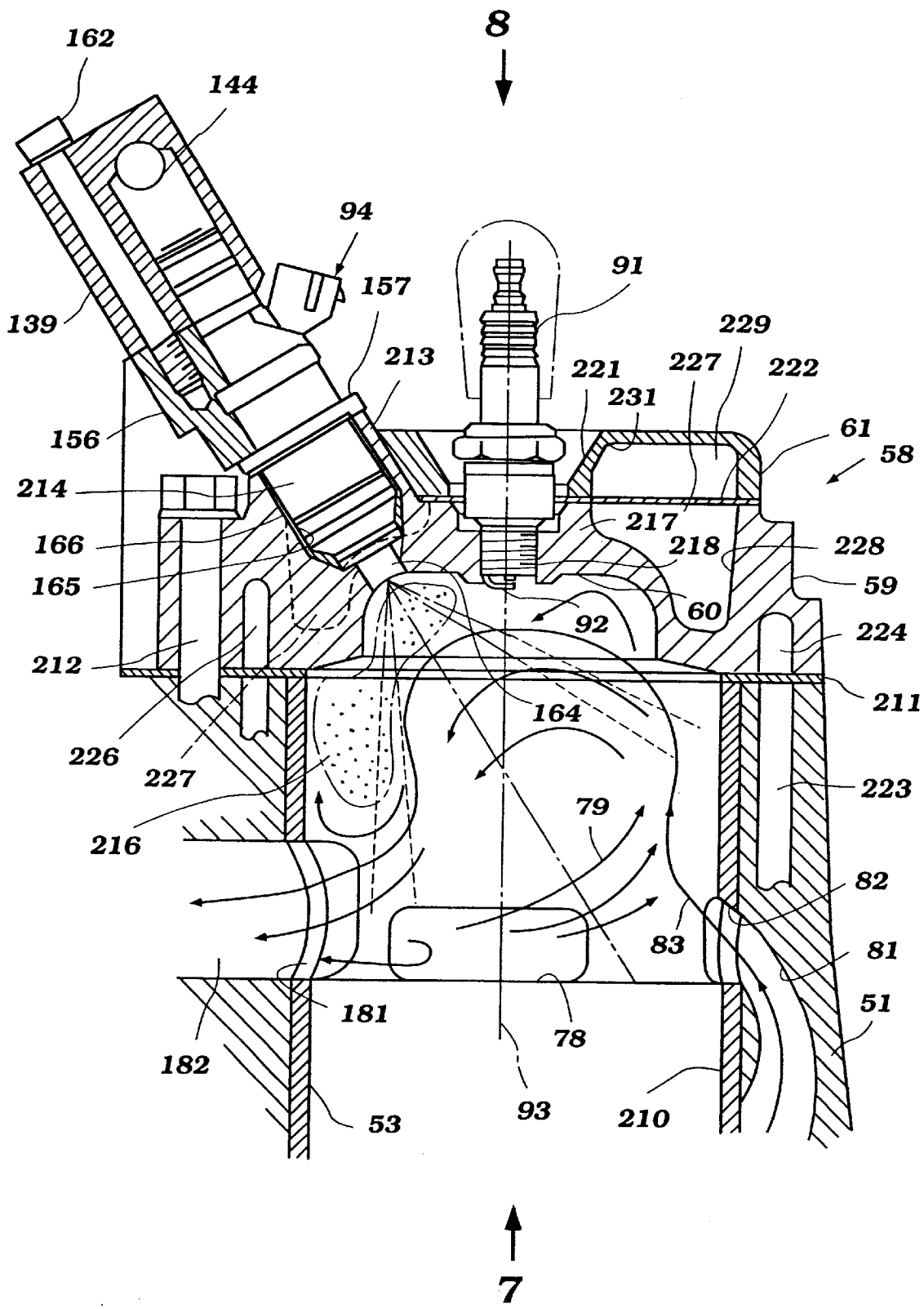
FIG. 6 is an enlarged cross-sectional view taken through a portion of one of the cylinders of the engine in the first embodiment of this invention and shows in detail a cooling arrangement of the fuel injector as well as a fuel injection spray pattern relative to the scavenging air flow and the residual chart.

The charge which is compressed in the sections of the crankcase chamber 56 is then transferred to the combustion chambers 60 as through a scavenging system which appears best in FIG. 6. This scavenging system is of the Schnurl type and includes a pair of main scavenge passages (not shown) that are positioned on diametrically opposite sides. These main scavenge passages terminate in main scavenge ports 78 so as to direct scavenge air flow as indicated by the arrows 79 in FIG. 6.

In addition, an auxiliary scavenging passage 81 is formed between the main scavenge passages and terminates in an auxiliary scavenging port 82 which also provides scavenging air flow indicated by the arrows 83. Thus, during the scavenging stroke, the intake charge will be transferred to the combustion chambers 60 for further compression as the pistons 54 move upwardly from their bottom dead center position so as to close the scavenge ports 78 and 82 and further compress the charge.

Continuing to refer primarily to FIG. 6, a spark plug 91 is mounted in the cylinder head assembly 58 for each cylinder bore 53 and has its respective spark gap 92 disposed substantially on the cylinder bore axis 93 and exposed to the combustion chamber 60. The spark plug 91 is fired under the control of the ECU 76. The ECU 76 receives certain signals, as will be described, for controlling the time of firing of the spark plugs 91 in accordance with any desired control strategy.

The spark plug 91 fire a fuel air charge that is formed by mixing fuel directly with the intake air via a fuel injector, indicated generally by the reference numeral 94. The fuel injectors 94 are solenoid type and electrically operated also under control of the ECU 76.

The fuel injectors 94 are mounted directly in the cylinder head 59 in a specific location, as will be described, so as to provide optimum fuel vaporization under all running conditions.

Fuel is supplied to the fuel injectors 94 by a fuel supply system, indicated generally by the reference numeral 96 (see the upper and lower left hand views of FIG. 1).

The fuel supply system 96 is composed of a main fuel supply tank 97 that is provided in the hull of the watercraft with which the outboard motor 31 is associated. Fuel is drawn from this tank 97 through a conduit 98 by means of a first low pressure pump 99 and a plurality of second low pressure pumps 101. The first low pressure pump 99 is a manually operated pump and the second low pressure pumps 101 are diaphragm type pumps operated by variations in pressure in the sections of the crankcase chamber 56, and thus provide a relatively low pressure.

A quick disconnect coupling is provided in the conduit 98 and also a fuel filter 102 is positioned in the conduit 98 at an appropriate location.

From the low pressure pump 101, fuel is supplied to a vapor separator 103 which is mounted on the engine 34 or within the cowling 36 at an appropriate location. This fuel is supplied through a line 104. At the vapor separator 103 and end of the line 104, there is provided at a float valve that is operated by a float 106 so as to maintain a uniform level of fuel in the vapor separator 103.

A high pressure electric fuel pump 107 is provided in the vapor separator 103 and pressurizes fuel that is delivered through a fuel supply line 108 to a high pressure pumping apparatus, indicated generally by the reference numeral 109. The electric fuel pump 107, which is driven by an electric motor, develops a pressure such as 3 to 10 kg/cm$^2$. A low pressure regulator 111 is positioned in the line 108 at the vapor separator 103 and limits the pressure that is delivered to the high pressure pumping apparatus 109 by dumping the fuel back to the vapor separator 103.

The high pressure fuel delivery system 109 includes a high pressure fuel pump 112 that can develop a pressure of, for example, 50 to 100 kg/cm$^2$ or more. A pump drive unit 113 is provided for driving the high pressure fuel pump 112.

As seen in FIGS. 2 to 5, the pump drive unit 113 is partly affixed to a stay 114 with bolts 116 and affixed to the cylinder body 51 at bosses 117 with bolts 118 and also partly directly affixed to the cylinder body 51 with bolts (not shown) at a boss 119 so as to overhang between the two banks 52 of the V arrangement. A pulley 120 is affixed to a pump drive shaft 121 of the pump drive unit 113. The pulley 120 is driven from a driving pulley 122 affixed to the crankshaft 47 by means of a drive belt 123.

The pump drive shaft 121 is provided with a cam disc 124 (FIG. 3) existing horizontally for pushing plungers 126 which are disposed on the high pressure fuel pump 112.

The high pressure fuel pump 112 is mounted on the pump drive unit 113 with bolts 127. The high pressure fuel pump 112 has a unified fuel inlet and outlet module 128 which is mounted on a side wall of the pressure pump 112. The inlet and outlet module 128 has an inlet passage 129 connected with the line 108 (FIG. 1), an outlet passage 131 connected with a fuel supply conduit 132 and an overflow passage 133 connected with the vapor separator 103 (FIG. 1). The line for returning the overflow fuel to the vapor separator 103 is omitted in FIG. 1.

The pressure of the fuel supplied by the fuel pump 112 is regulated to be the fixed value by a high pressure regulator 134 which dumps fuel back to the vapor separator 103 through a pressure relief line 136 in which a fuel heat exchanger or cooler 137 is provided.

Fuel is supplied from the high pressure fuel pump 112 to the fuel supply conduit 132. The fuel supply conduit 132 is comprised of a main fuel manifold 138 that extends horizontally and a pair of vertically extending fuel rails 139. The main fuel manifold 138 delivers fuel to the fuel rails 139 and the fuel rails 139 deliver fuel to the fuel injectors 94.

The fuel rails 139 are affixed to the main fuel manifold 138 with bolts 141. Also, the respective fuel rails 139 are affixed to both of the cylinder heads 59 with bolts 142. Thus, the fuel supply conduit 132 is mounted on the engine 34 by means of the pump drive unit 113 via the stay 114, partly directly, at the cylinder body 51 and by means of fuel rails 139 at the cylinder head 59.

The main fuel manifold 138 and the fuel rails 139 are hollow tubes and the hollows therein form fuel passages 143 and 144. The fuel passage 143 in the main fuel manifold 138 and the fuel passages 144 in the fuel rails 139 are connected with each other. The outlet passage 131 of the fuel inlet and outlet module 128 is connected to the fuel passage 143 of the main fuel manifold 138 with a connector 146 around which is sealed with O-shaped elastic (rubber) rings 147. The main manifold 138 and the fuel rails 139, in turn, are connected together with connectors 148 around which are sealed with the same O-shaped elastic rings 149 also.

Figure 4:
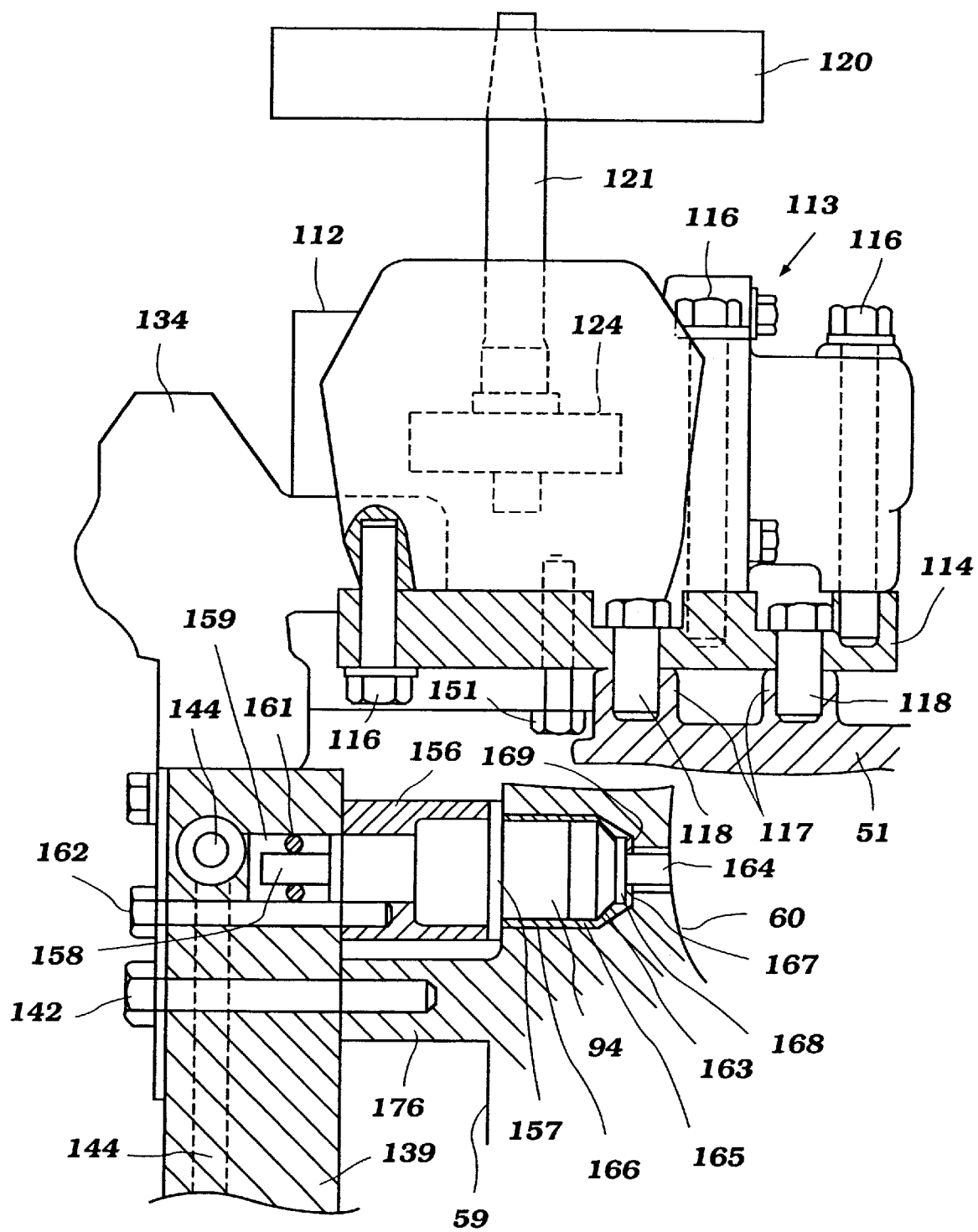
FIG. 4 is an enlarged elevational view of the engine showing partly in cross-section, and is taken generally in the direction of the arrow 4 in FIG. 3.

The pressure regulator 134 is also mounted on the pump drive unit 113 with bolts 151 (FIG. 4). The pressure regulator 134 has a passage 152 therein that forms a part of the pressure relief line 136 (FIG. 1) and this passage 152 is connected to the fuel passage 143 in the main fuel manifold 138 with a connector 153 around which is also sealed with an O-shaped elastic ring 154.

Figure 5:
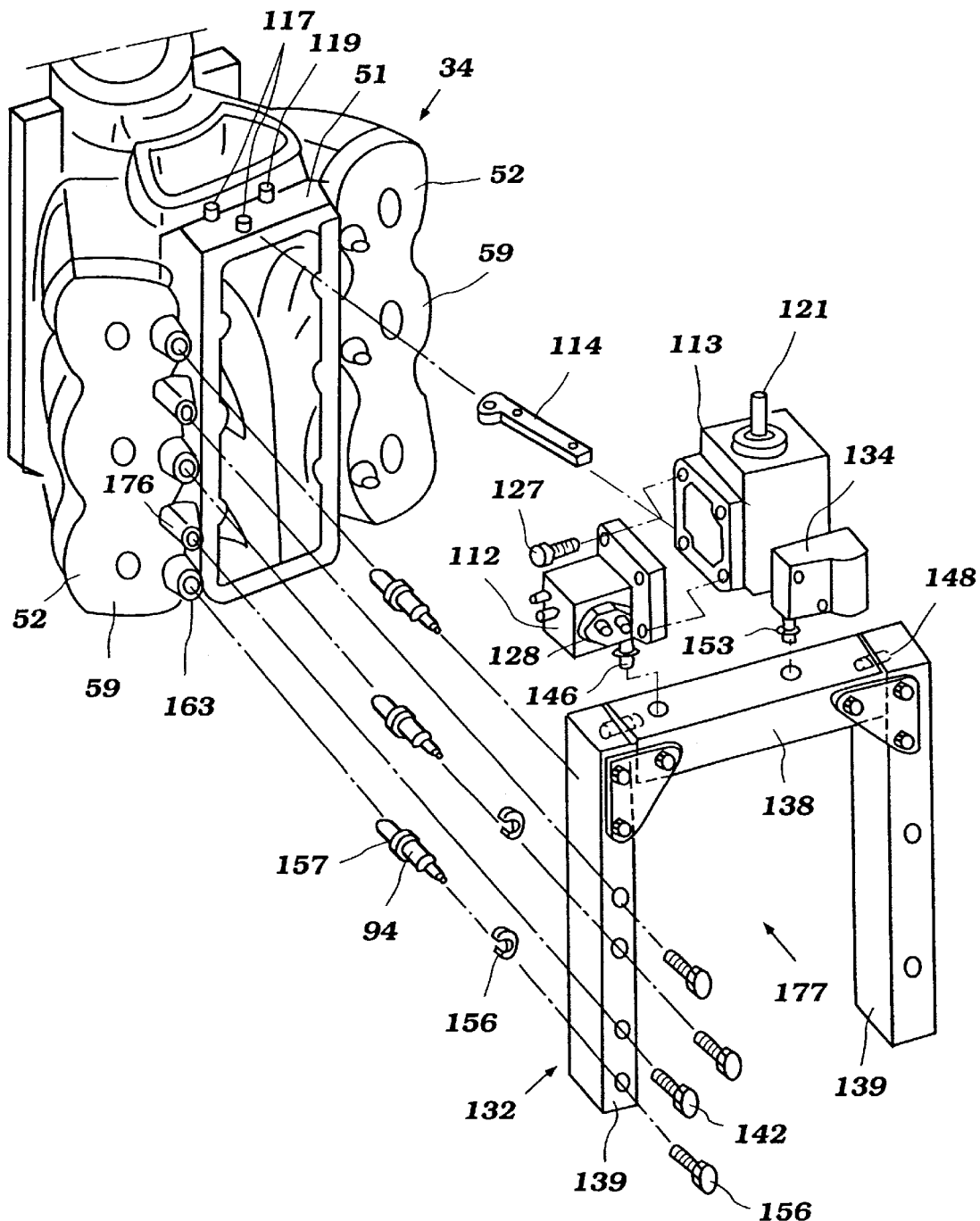
FIG. 5 is a perspective view showing some components exploded from the engine.

The fuel injectors 94 are provided between the fuel rails 139 and the cylinder head 59 in the following manner. As best seen in FIGS. 4 and 5, a horseshoe shaped spacers 156 are disposed between flanges 157 formed around the fuel injectors 94 and the fuel rails 139. The rear ends 158 of the fuel injectors 94 are placed in small chambers 159 with O-shaped elastic (rubber) rings 161. The small chambers 159 are connected to the fuel passage 144. The spacers 156 are affixed to the fuel rails 139 with bolts 162 and hence the fuel injectors 94 are affixed to the fuel rails 139 by means of that connections.

The fuel injectors 94 are, then, inserted into openings 163 which are provided on the cylinder head 59 so that nozzles 164 of the fuel injectors 94 is exposed to the combustion chambers 60. The opening 163 is larger than the diameter of a fuel injector 94 so that a gap 165 is formed between them. This gap 165 is filled with a heat exchanger medium 166 that will be described later in connection with FIG. 6. A seal member 167 which is made of metal, such as a disc spring, is provided between a shoulder 168 of the fuel injector 94 and a step 169 formed in the opening 163 to have the shoulder 168 seated. The reason why the metal seal member 167 is used for sealing here is that the combustion gases have an extremely high pressure and high temperature.

Then, the fuel rails 139 are fixed to bosses 176 formed on the outer surface of the both cylinder heads 59 with the bolts 142. The sub-assembled unit including the fuel supply conduit 132, the high pressure pumping apparatus 109 (the high pressure pump 112 and the pump drive unit 113), the pressure regulator 134 and the fuel injectors 94 forms a high pressure fuel injection unit 177 (FIG. 5).

Figure 2:
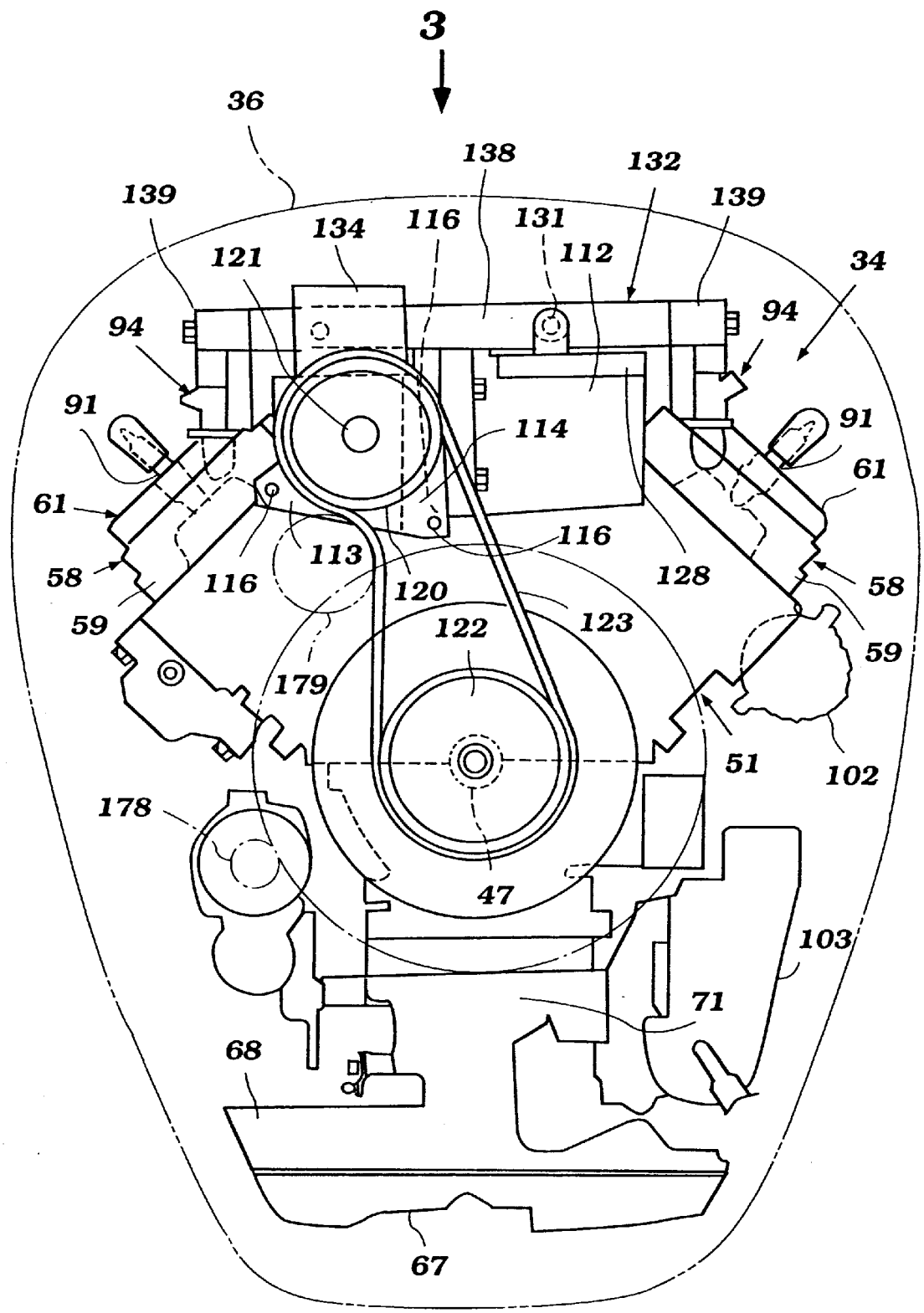
FIG. 2 is a top plan view of the power head showing the engine in solid lines and the protective cowling in phantom.
Figure 3:
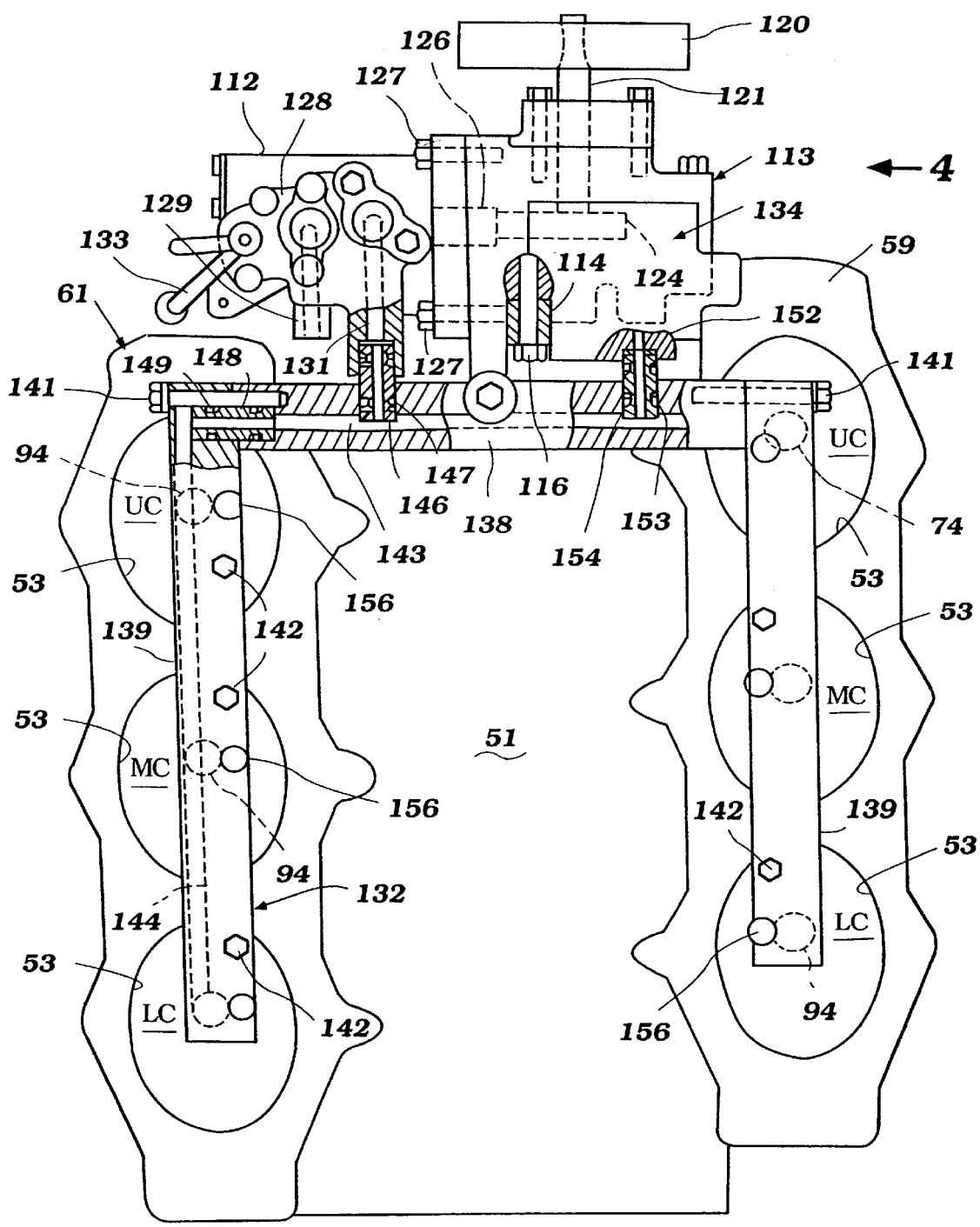
FIG. 3 is a rear elevational view of the engine showing partly in cross-section and is taken generally in the direction of arrow 3 in FIG. 2.

In addition, a starter motor 178 for starting the engine 34 and a tensioner 179 for giving tension to the belt 123 are provided (FIG. 2).

Returning to FIG. 1, after the fuel charge has been formed in the combustion chambers by the injection of fuel from the fuel injectors 94, the charge is fired by firing the spark plugs 91. The injection timing and duration, as well as the control for the timing of firing of the spark plugs 91, are controlled by the ECU 76.

Once the charge burns and expands, the pistons 54 will be driven downwardly in the cylinder bores 53 until the pistons 54 reach the lowermost position. At this time, an exhaust port 181 (FIG. 6) will be uncovered so as to open the communication with an exhaust passage 182 (FIG. 6 and the lower left-hand view of FIG. 1) formed in the cylinder block 51.

The exhaust gases flow through the exhaust passages 182 to manifold collector sections 183 of respective exhaust manifolds that are formed within the cylinder block 51. These exhaust manifold collector sections 183 communicate with exhaust passages formed in an exhaust guide plate 37 on which the engine 34 is mounted.

A pair of exhaust pipes 184 depends from the exhaust guide plate 37 and extend the exhaust passages 182 into an expansion chamber 186 formed in the driveshaft housing 32. From this expansion chamber 186, the exhaust gases are discharged to the atmosphere through a suitable exhaust system. As is well known in outboard motor practice, this may include an underwater, high speed exhaust gas discharge and an above the water, low speed exhaust gas discharge. Since these types of systems are well known in the art, a further description of them is not believed to be necessary to permit those skilled in the art to practice the invention.

Although any type of desired control strategy can be employed for controlling the time and duration of fuel injection from the injector 94 and timing of firing of the spark plug 91, it will be apparent from the following description that there is some significance in injector timing to improve good fuel vaporization under difficult running conditions. However, a general discussion of some engine conditions that may be sensed and some other ambient conditions that can be sensed for engine control will follow. It is to be understood, however, that those skilled in the art will readily understand how various control strategies can be employed in conjunction with the components of the invention.

Preferably, the control for the fuel air ratio includes a feed back control system. Thus, a combustion condition or oxygen sensor 191 is provided that senses the in-cylinder combustion conditions by sensing the residual amount of oxygen in the combustion products at a time near the time when the exhaust port 181 (FIG. 6) is opened. This output is indicated schematically at 192 to the ECU 76.

There is provided also associated with the crankshaft 47 a crank angle position sensor 193 which when measuring crank angle versus time and output an engine speed signal, indicated schematically at 194. Engine load, as determined by throttle angle of the throttle valve 72, is sensed by a throttle position sensor 195 which outputs a throttle position or load signal 196 to the ECU 76.

There is also provided a pressure sensor 197 in line connected to the pressure regulator 134. This pressure sensor 197 outputs the high pressure fuel signal to the ECU 76 (signal line is omitted).

There is further provided a water temperature sensor 198 (see the lower right-hand view) which outputs a cooling water temperature signal 199 to the ECU 76.

Further, an intake air temperature sensor 201 (see the upper view) is provided and this sensor 201 outputs an intake air temperature signal 202 to the ECU 76.

The sensed conditions are merely some of those conditions which may be sensed for engine control and it is, of course, practicable to provide other sensors such as an engine height sensor, a trim angle sensor, a knock sensor, a neutral sensor, a watercraft pitch sensor and an atmospheric temperature sensor in accordance with various control strategies.

The ECU 76, as has been noted, outputs signals to the fuel injectors 94, the spark plugs 91, the lubrication pump 74 and the high pressure electric fuel pump 107 for their respective controls. These control signals are indicated schematically in FIG. 1 at 203, 204, 205 and 206, respectively.

Referring now to FIGS. 6 through 10, the first embodiment for cooling the fuel injector 94, particularly its front portion that includes the injector nozzle 164 will be described.

Figure 7:
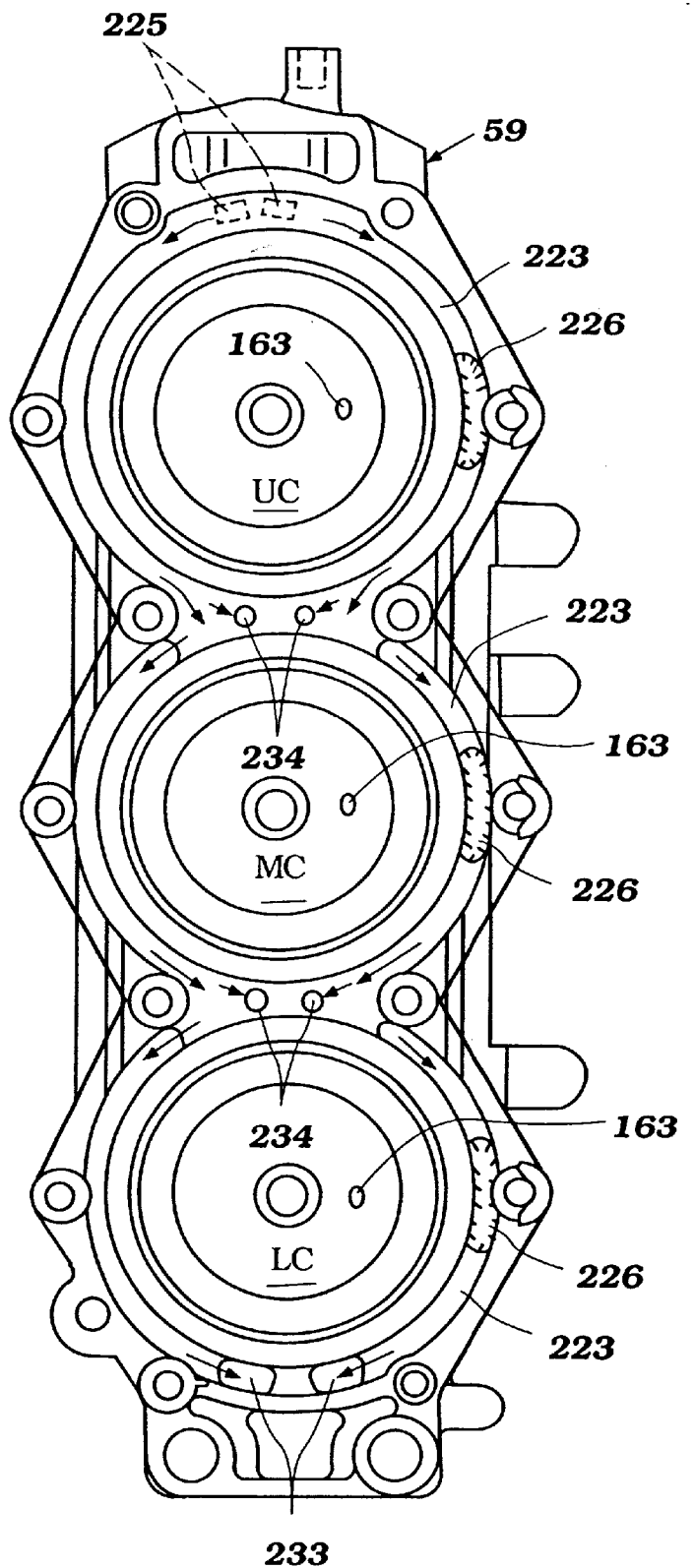
FIG. 7 is an elevational view showing the cylinder head and taken in the direction of the arrow 7 in FIG. 6, as removing all other components.
Figure 8:
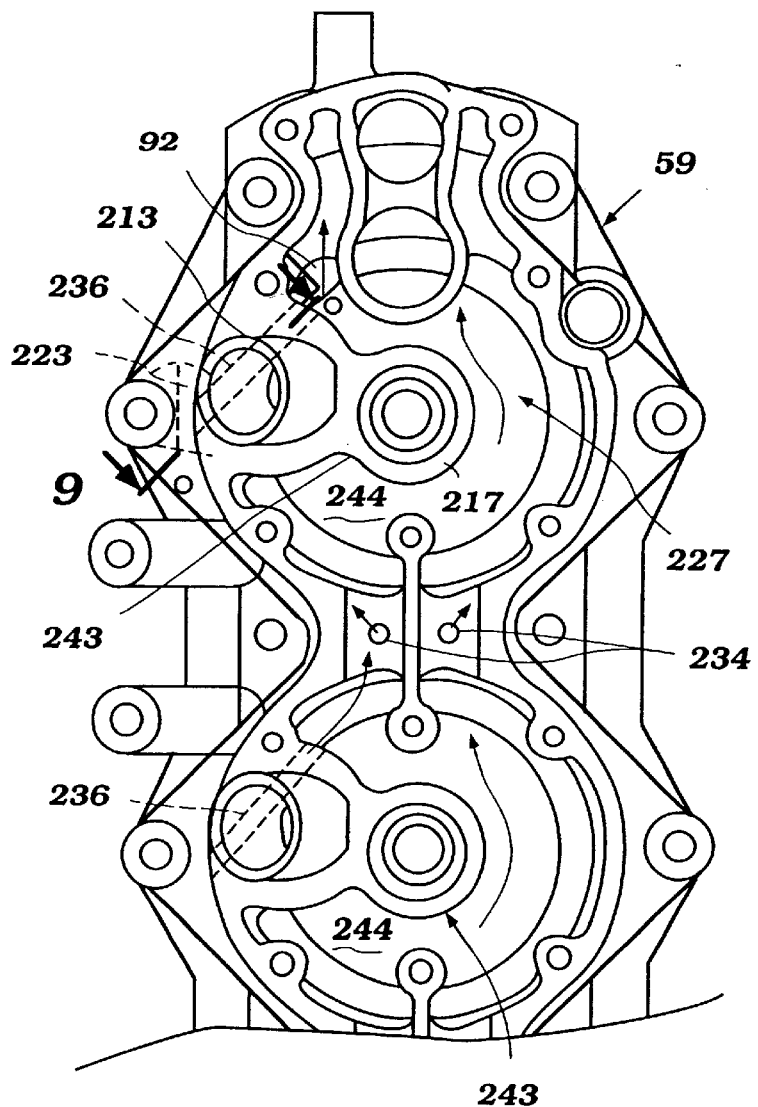
FIG. 8 is an elevational and partial view showing the same cylinder head taken in the direction of the arrow 8, as removing all other components.
Figure 9:
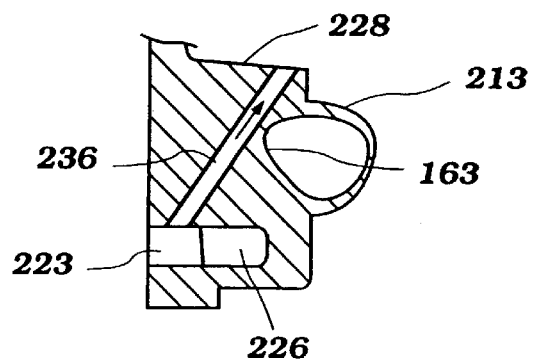
FIG. 9 is a cross-sectional view showing the same cylinder head and taken along the line 9—9 in FIG. 8.
Figure 10:
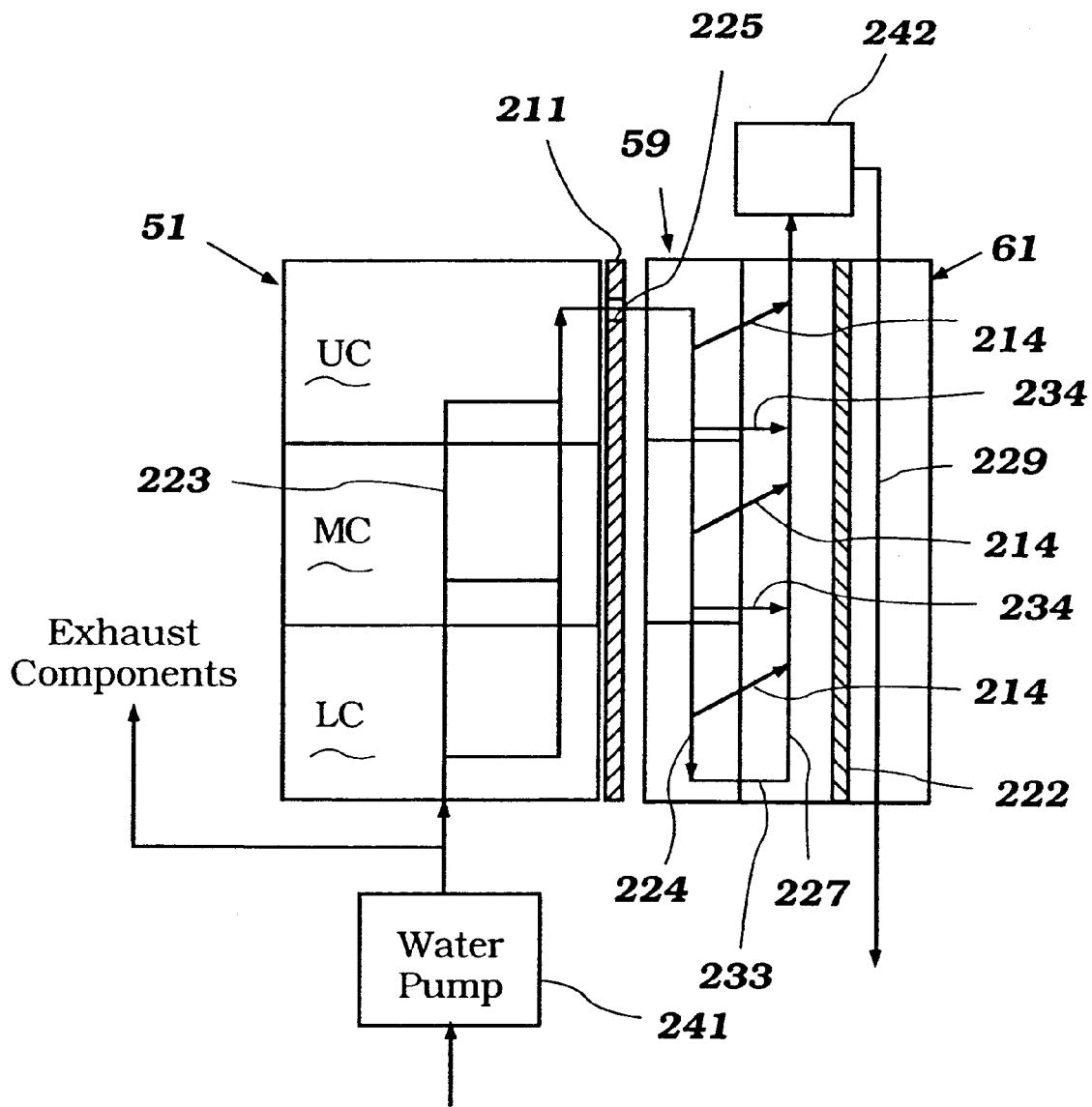
FIG. 10 is a schematic view showing the flows of the cooling water in this first arrangement.

FIG. 6 illustrates an enlarged cross-sectional view taken through a portion of one of the cylinders of the engine of this embodiment and shows in detail a cooling arrangement of the fuel injector 94 as well as the fuel injection spray pattern relative to the scavenging air flow and the residual chart. This figure has been already partly described in connection with the general description of the outboard motor construction including the outline of the engine operation. FIG. 7 illustrates an elevational view showing the cylinder head 59 and taken in the direction of the arrow 7 in FIG. 6, as removing all other components. FIG. 8 illustrates an elevational and partial view showing of the same cylinder head 59 taken in the direction of the arrow 8, as removing all other components. FIG. 9 illustrates a cross-sectional view showing the same cylinder head 59 and taken along the line 9—9 in FIG. 8. FIG. 10 illustrates a schematic view showing flows of the cooling water in this first embodiment.

A cylinder liner 210 is provided on the inner surface of the cylinder body 51. The cylinder head 59 is affixed to the cylinder body 51 via a gasket 211 with bolts 212. The cylinder head 59 has a boss 213 for holding a front portion 214 of the fuel injector 94. The boss 213 has a certain angle versus the cylinder bore axis 93 so that the injection nozzle 164 is placed slantwise to the left side in FIG. 6. The injection nozzle 164 is exposed to the combustion chamber 60 through the opening 163, as aforenoted in connection with FIG. 4, at the bottom of the recess in the boss 213. The gap 165 made between the inside wall of the boss 213 and the front portion 214 of the fuel injector 94 is filled with the heat exchanger medium 166 such as a silicone rubber and a silicone resin so as to expedite heat discharge from the fuel injector 94. The boss 213 is disposed on the side of the exhaust port 181. Because the injected fuel 216 tends to be biased to this side by the scavenging flows 79 and 83 and can cool down this part of the cylinder head 59 better than the other part so that the front portion 214 of the fuel injector 94 is also well cooled down.

The cylinder head 59 has another boss 217 having an opening 218 through which the spark plug 91 is inserted and screwed down therein. Both of the fuel injector boss 214 and the spark plug boss 217 are connected with each other to increase the rigidity of these bosses per se as well as the rigidity of the cylinder head 59. The cylinder head 59 is covered with the cylinder head cover 61 that has an opening 221 that has a diameter larger than the spark plug 91 so that the spark plug 91 is inserted to the boss 217 of the cylinder head 59. Another gasket 222 is also provided between the cylinder head 59 and the cylinder head cover 61. The cylinder head cover 61, the cylinder head 59 and the cylinder body 51 are securely connected with connecting bolts (not shown) in a manner that is well known in this art.

A cooling jacket 223 is formed circumferentially around the cylinder bore 53. Another cooling jacket 224 is also formed circumferentially around the recess 60 of the cylinder head 59. The gasket 211 has upper communication apertures 225 at its almost uppermost portion (see FIG. 7) so as to allow water to flow into the cylinder head cooling jacket 224 from the cylinder body cooling jacket 223. A cavity 226 is provided in the cylinder head cooling jacket 224 so that the cavity 226 is located in the close proximity to the front portion 214 of the fuel injector 94. That is, the cavity 226 is formed deeper than the other part of the cylinder head cooling jacket 224. Because of this, cooling water is permitted to approach closer to the front portion 214 of the fuel injector 94.

A water passage 227 is formed between the outer surface 228 and the gasket 222. Another water passage 229 is formed between a recessed portion 231 on the cylinder head cover 61 and the gasket 222. Lower communication apertures 233 are provided at the proximity of the lowermost portion of the cylinder head 59 to discharge the water from the cylinder head cooling jacket 224 and then supply it to the water passage 227. Middle communication apertures 234 are provided between the uppermost cylinder UC and the middle cylinder MC and also between the middle cylinder MC and the lowermost cylinder LC for allowing water, again, to flow from the cylinder head cooling jacket 224 to the water passage 227.

Bypasses 236 are provided at individual cylinders UC, MC and LC for further cooling the respective fuel injectors 94. As best seen in FIGS. 8 and 9, the bypasses 236 are placed directly under the fuel injector bosses 213 and allow water to flow from the water passage 227 to the other water passage 229. The water flowing through these bypasses 236 can take heat away from the block around the bypasses 236 that include the fuel injector bosses 213. The heat exchanger medium 166 in each gap 165 formed between the inner wall of the boss 213 and the fuel injector 94 expedites this cooling effect. Thus, the front portions 214 of the fuel injectors 94 are efficiently cooled down.

The flow of the cooling water in this arrangement will now be again described more in detail with reference to FIG. 10. Water is introduced into the cooling system from the body of water around the outboard motor 31 by means of a water pump 241. Some of this water is used for cooling the exhaust passages 182 and manifold collector sections 183 and rest part of the water is supplied to the cylinder body cooling jacket 223 for cooling the cylinder body 51 (respective cylinders UC, MC and LC). Next, the water goes into the cylinder head cooling jacket 224 through the upper communication apertures 225. Primarily, the water flow into the water passage 227 through the lower communication apertures 233. However, additionally, some of the water goes into the water passage 227 en route through middle communication apertures 234. The flow of the water in the cylinder head cooling jacket 224 and the water passage 227 cools the body of the cylinder head 59.

Further, in this embodiment, the water in the cylinder head cooling jacket 224 goes into the water passage 227 through the bypasses 236. During flowing through these bypasses 236, the water expedites the cooling effect of the fuel injector bosses 213 and eventually the cooling effect of the fuel injectors 94 per se.

The water, then, goes to a thermostat compartment 242 wherein a thermostat is provided for controlling water flow when the water temperature is lower than a predetermined value in a well known manner. After passing through the thermostat compartment 242, the water goes to the water passage 229 in the cylinder head cover 61 for cooling this cylinder head cover 61 and finally the water is discharged to the body of water outside of the outboard motor 31.

As seen in FIG. 8, however, the fuel injector bosses 213 and the spark plug bosses 217 are connected with each other and they make walls 243 that can obstruct flow of the cooling water. Because of this, a backwater or pool 244 may be formed at each wall 243.

Another arrangement, which is a second embodiment of this invention and shown in FIGS. 11 through 15, is useful for removing this backwater 244. In these figures, the same components and members as described in connection with the former arrangement illustrated in FIGS. 1 through 10 are assigned with the same reference numerals so as to avoid redundancy. The other embodiments described later will be the same.

Figures 13, 14:
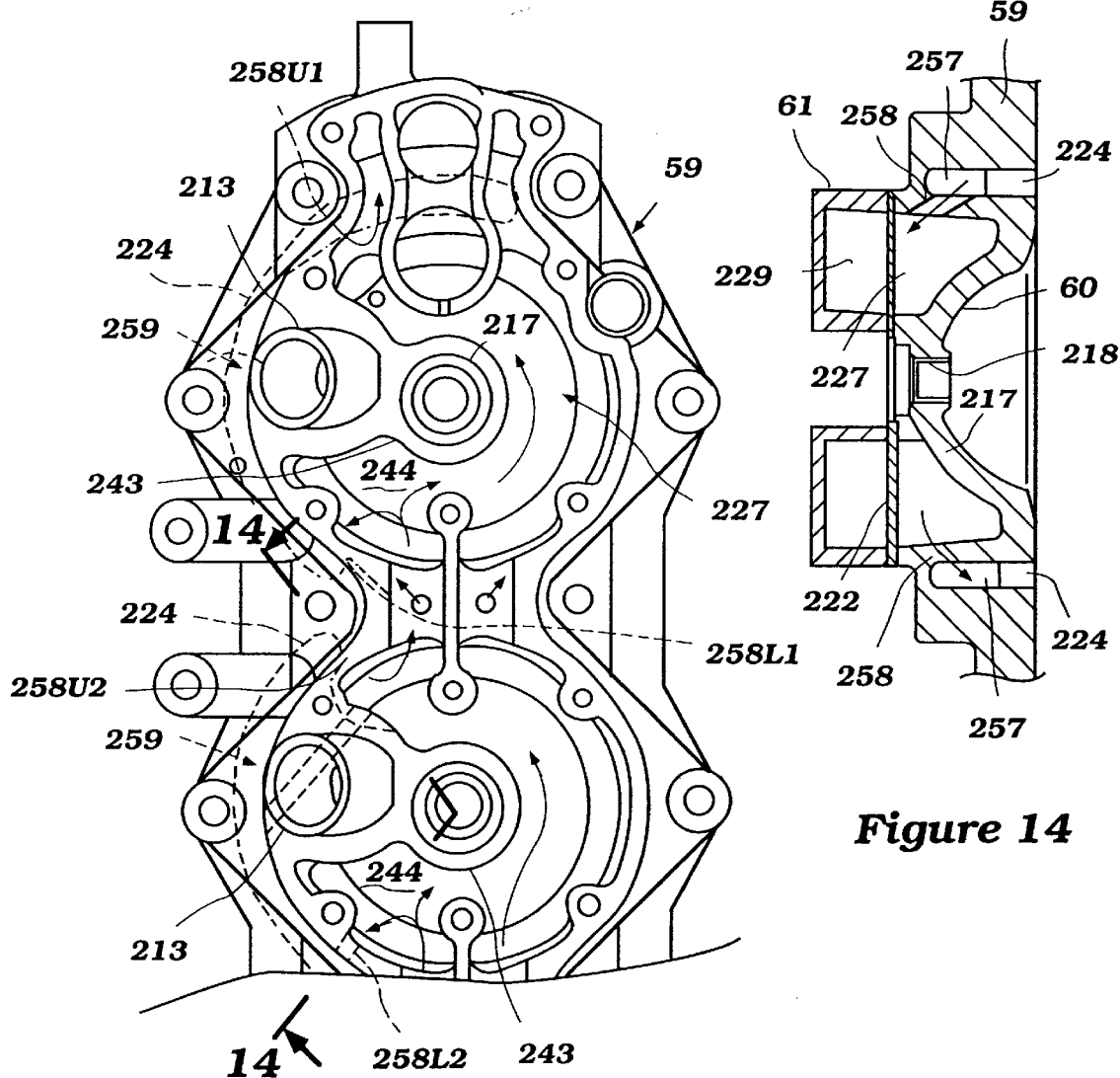
FIG. 13 is a rear elevational and partial view of the cylinder head, as removing all other components.
FIG. 14 is a cross-sectional view showing the cylinder head covered with a cylinder head cover member, and sectioned taken along the line 14—14 in FIG. 13.
Figure 15:
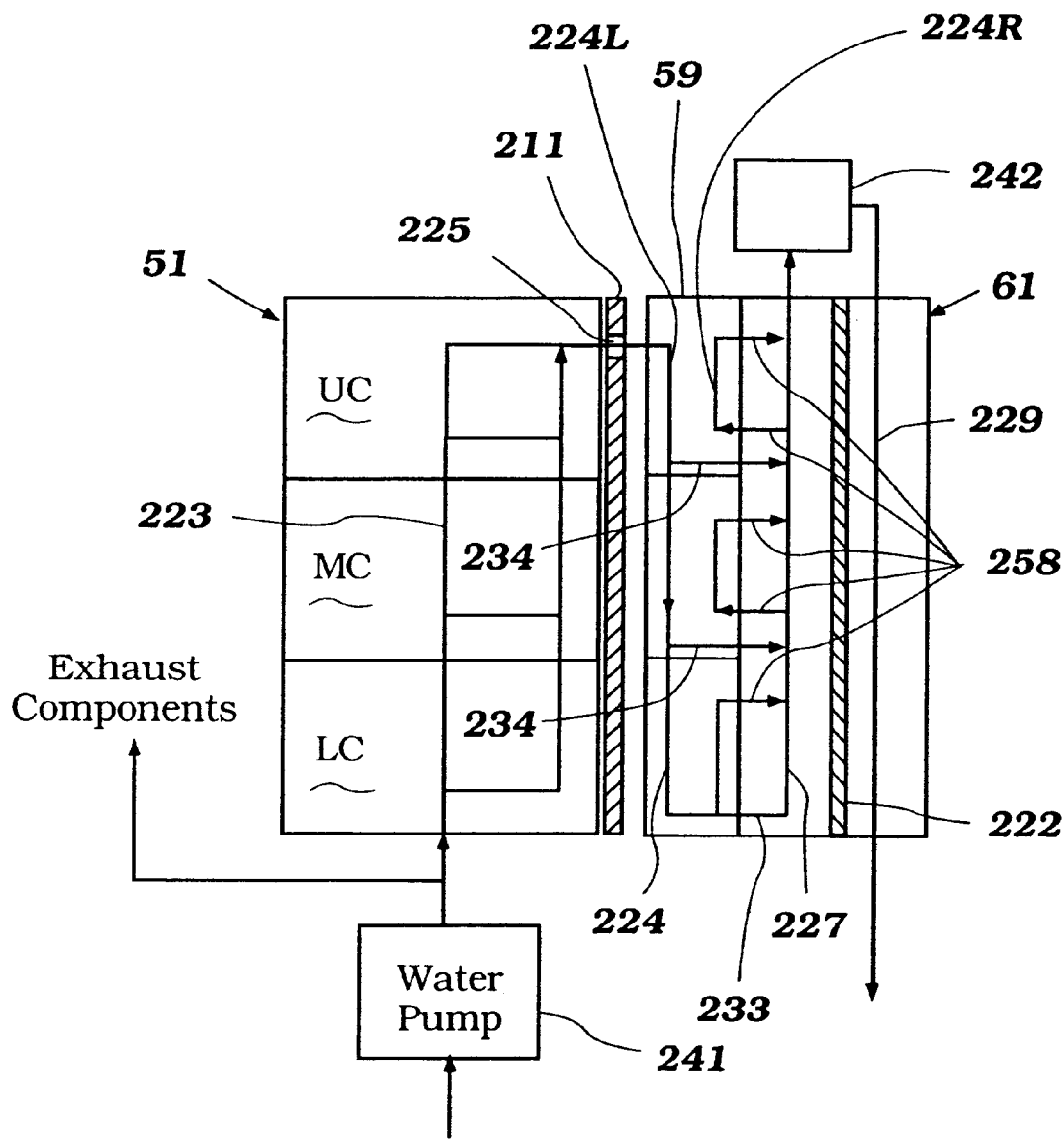
FIG. 15 is a schematic view showing the flows of the cooling water in the second embodiment.

FIG. 11 is an elevational view showing the cylinder head 59 of the second embodiment and FIG. 12 illustrates a cross-sectional view taken along the line 12—12 in FIG. 11. FIG. 13 is an elevational and partial view of the same cylinder head 59 and FIG. 14 illustrates a cross-sectional view showing the same cylinder head 59 taken along the line 14—14 in FIG. 13. FIG. 15 illustrates a schematic view showing flows of the cooling water in this second embodiment.

Dams 256 are provided at the upper of the cylinder UC, between the cylinders UC and MC and also between the cylinders MC and LC, but slightly the right hand portions in the cylinder head cooling jacket 224 for blocking water flow. Cavities 257 are provided at immediately adjoining positions of the dams 256 and, as seen in FIG. 14, the respective cavities 257 are connected to the water passage 227 through passes 258 that are apertures extending from the halfway of each cavity 257. The passes 258 (indicated 258U1 and 258U2 in FIG. 13) connected to the cavities 257 and placed under the dams 256 open at the upper side of the wall portion 243. Meanwhile, the other passes 258 (indicated 258L1 and 258L2) connected to the other cavities 257 and placed above the dams 256 open at the lower side of the wall portion 243 where the backwater 244 exists. Thus, a couple of portions of the cylinder head cooling jacket 224 form bypasses 259 that are detours for the obstructed water flow.

Thus, all of the water, which is introduced into the cylinder head cooling jacket 224 through the upper communication apertures 225, flows in the left hand direction and goes down to the lower communication apertures 233 in the left hand part 224L, of the cylinder head cooling jacket 224. During this flow, some of the water goes to the water passage 229 en route through the middle communication apertures 234. Then, some other part of the water that has reached at the lower communication apertures 233 flows into the water passage 227 also. However, the rest of the water again goes up in the right hand part 224R of the cylinder head cooling jacket 224.

Due to blocked by the first dam 256, the water is introduced into the first cavity 257 and then goes to the water passage 227. Then, the water reaches the backwater 244 and splits into two flows. One flow goes again into the water passage 24, more specifically, the right hand part of 224R thereof, through the pass 258 and the other flow goes up in the water passage 227. These two flows can clear away the water deposited in the backwater 244 smoothly. Thus, the cooling effect around the fuel injector boss 213 and the spark plug boss 217 is further expedited.

It should be noted that the passes 258 and the cooling jacket 224 together define bypasses 259 in this embodiment. However, the bypasses 236 applied in the first arrangement can be, of course, embodied in this second arrangement in addition to the bypasses 259.

It should be also noted that, in both of the first and second arrangements, the water can be supplied to the water passage 227 directly from the cylinder body cooling jacket 223.

It should be further noted that it is effective for cooling the injector nozzle 164 to dispose it remotely from the spark gap 92 as far as possible. For this remote location of the injector nozzle 164, the fuel injector 94 is moved parallely to the left side in FIG. 6 (or FIG. 14) or the slant angle of the fuel injector boss 213 is changed. Otherwise, both of them are made at once.

Figure 16:
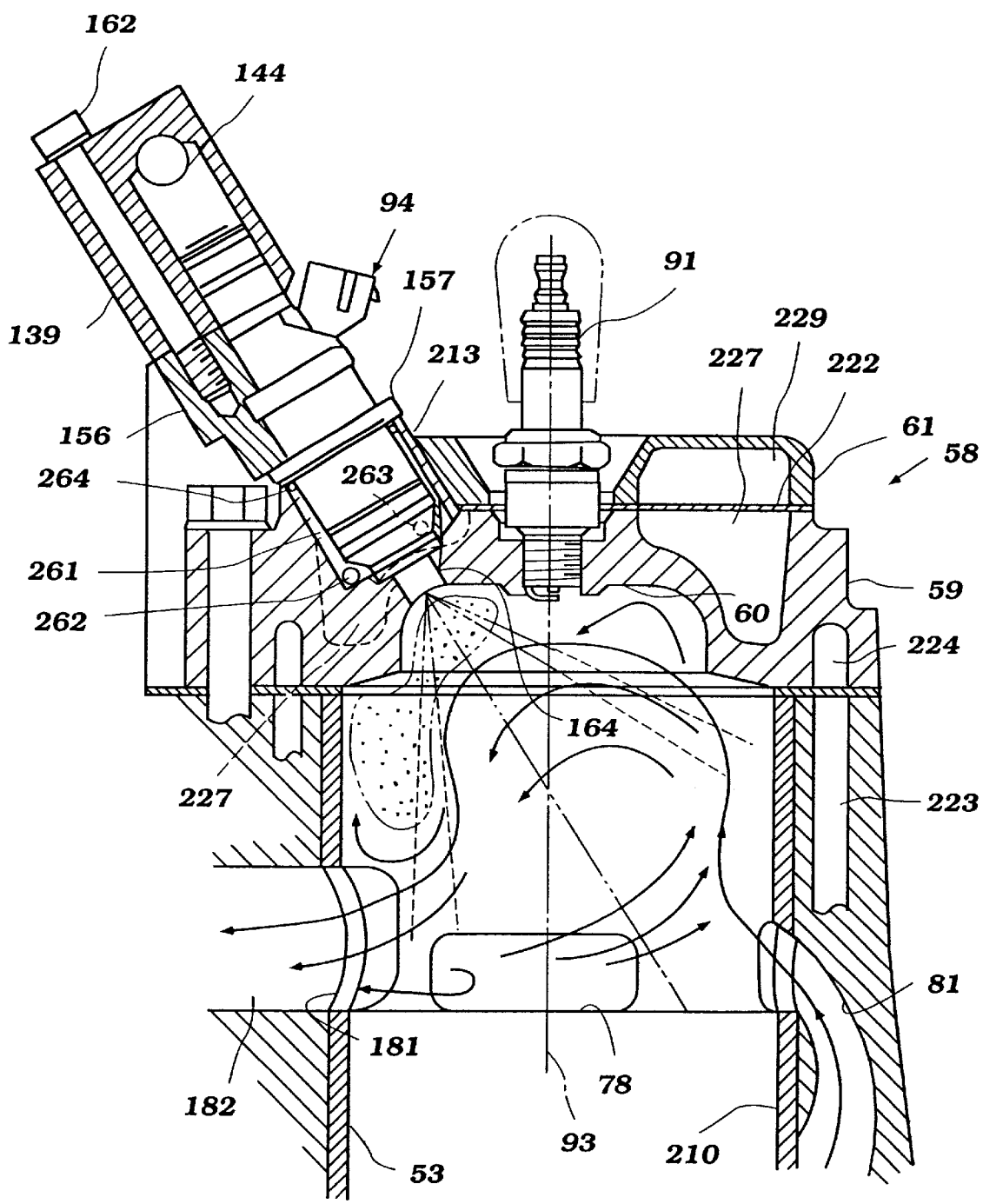
FIG. 16 is an enlarged cross-sectional view taken through a portion of one of the cylinders in a third embodiment of this invention and shows in detail a cooling arrangement of the fuel injector as well as a fuel injection spray pattern relative to the scavenging air flow and the residual chart that are basically the same as shown in FIG. 6.

FIG. 16 illustrates still another arrangement, which is a third embodiment of this invention. In this arrangement, the gap 165 formed between the inner wall of the boss 213 and the fuel injector 94 is used as a cooling cavity 261. For sealing up the cooling cavity 261, an O-shaped elastic (rubber) ring 264 is placed immediately below the flange 157. An inlet opening 262 and an outlet opening 263 are provided in this cooling cavity 261. Both of the openings 262 and 263 are connected to the water passage 227 so that the water in the water passage 227 is allowed to go into this cooling cavity 261 and go out from it. Thus, the cooling of the fuel injector 94 is expedited further.

It should be noted that both of the openings 262 and 263 can be connected to one of the cooling jackets 223 and 224, and further these openings 262 and 263 may be connected to the different water supply that is chosen from the cooling jackets 223 and 224, and the water passages 227 and 229.

In this engine 34 of the outboard motor 31, the cooling water comes up from the lower cylinder LC to the upper cylinder UC one by one. Accordingly, the lower the cylinder, the cooler the water. It is, therefore, preferable to make the inlet opening 262 and outlet opening 263 of the upper side cylinder larger than those of the lower side cylinder.

As described above, the injector nozzles 164 are effectively cooled so that it cannot have heat that is over the evaporation temperature (or the distillation temperature of major components) of the liquid fuel.

However, in case that heavy oil components deposit on the injector nozzles 164 for some reasons, the following embodiments of this invention can ensure correct controls of amounts of the fuel that are supplied to the fuel injectors 94.

Figure 17:
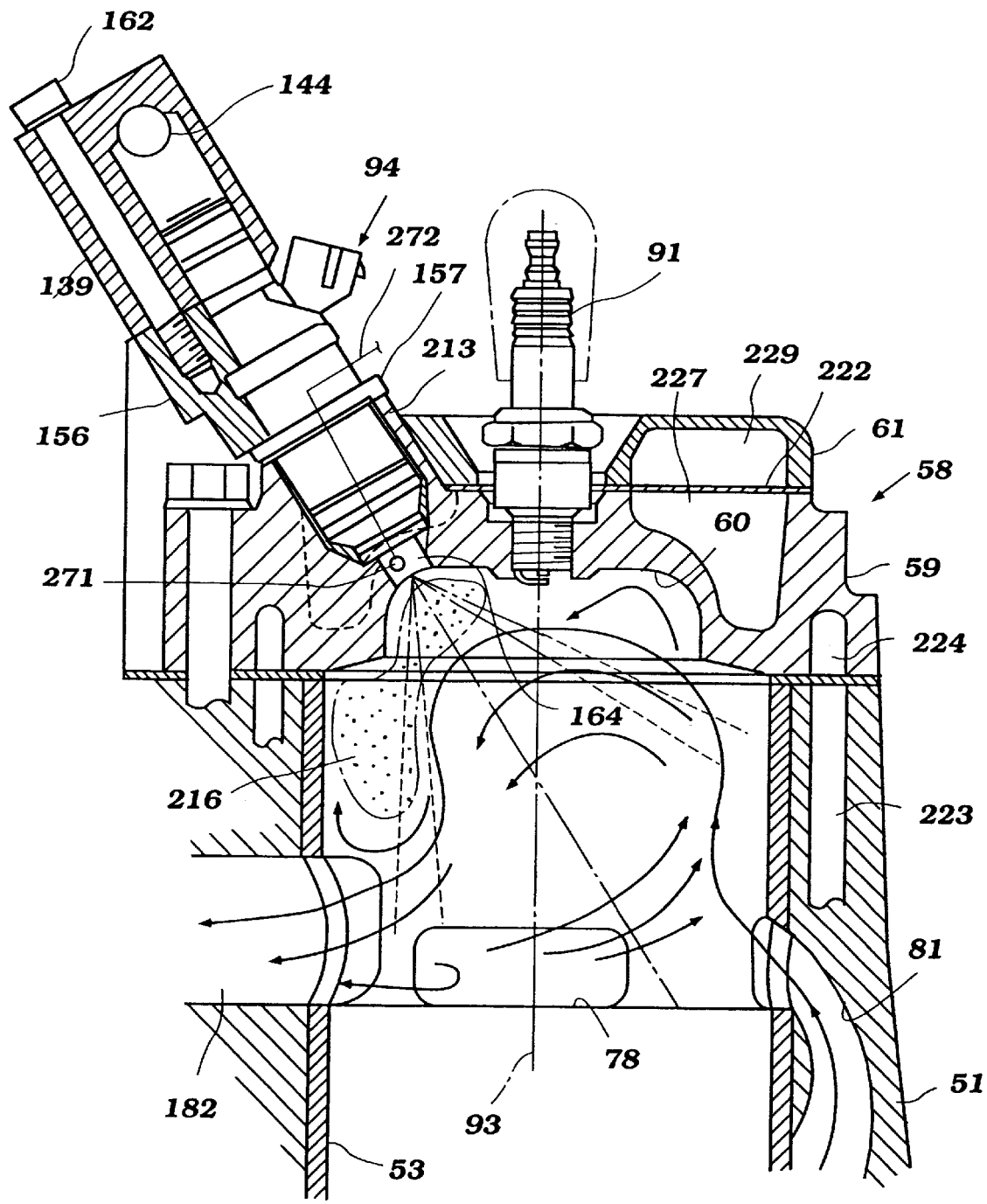
FIG. 17 is an enlarged cross-sectional view taken through a portion of one of the cylinders in a fourth embodiment of this invention and shows in detail a cooling arrangement of the fuel injector as well as a fuel injection spray pattern relative to the scavenging air flow and the residual chart that are basically the same as shown in FIG. 6.
Figure 18:
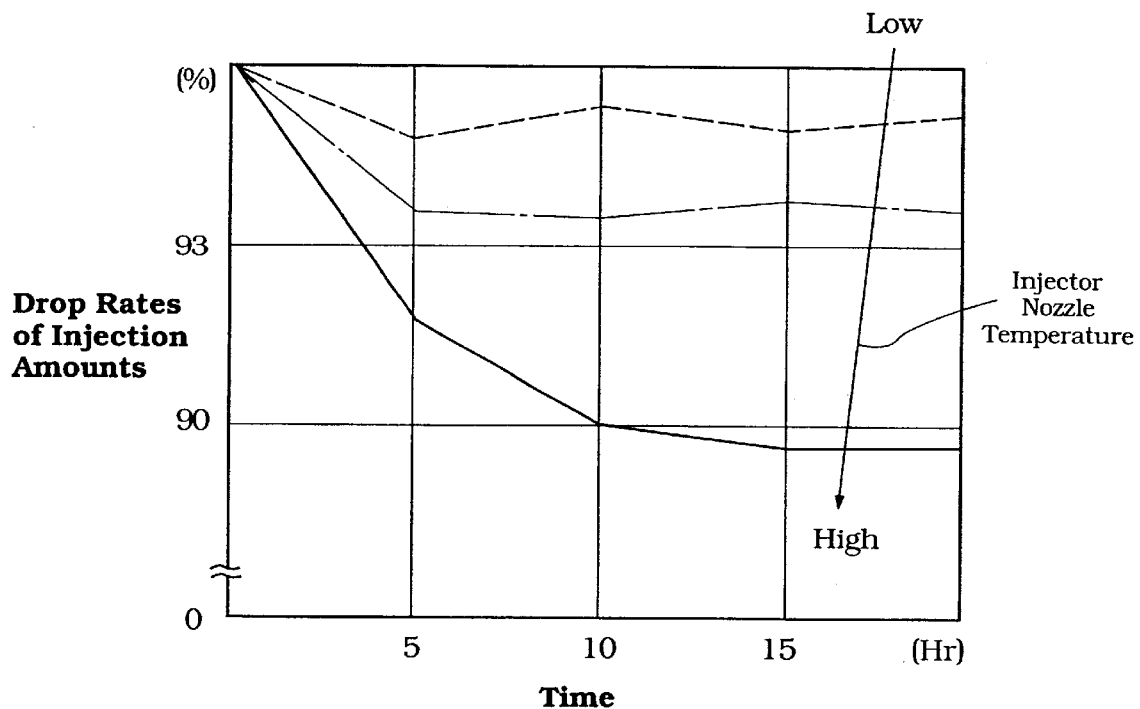
FIG. 18 is a graphical view showing the interrelationship between the time of engine operation and the drop rates of injection amounts, that is the base of the control strategy in this fourth embodiment.
Figure 19:
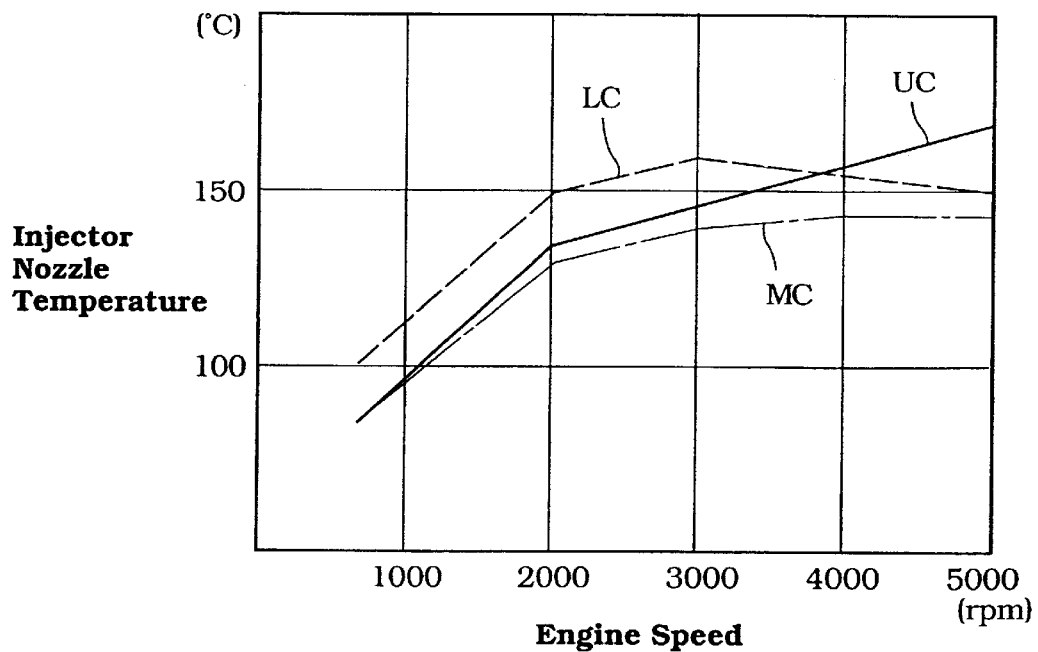
FIG. 19 is the interrelationship between the engine speeds and the temperature of the injector nozzle, that is also the base of the control strategy in the fourth embodiment.

FIGS. 17, 18 and 19 show the fourth embodiment of this invention. FIG. 18 illustrates a graphical view showing the interrelationship between the time of engine operation and the drop rates of injection amounts. FIG. 19 illustrates the interrelationship between the engine speeds and the temperature of the injector nozzle 164.

A temperature sensor 271 is provided at each injector nozzle 164 for sensing the temperature of the injector nozzle 164 and sending a temperature signal 272 that is schematically indicated to the ECU 76. The ECU 76, then, controls amounts of injected fuel as follows.

As aforedescribed, heavy oil components of the fuel are likely to deposit on the injector nozzle 164 as the temperature of the injector nozzle 164 rises. The higher the temperature, the more the amounts of the deposited heavy oil components. The increase of the deposits precludes the fuel from being injected. In other words, drop rates of the injection amounts increase with the increase of the deposits. This situation is shown in FIG. 18. However, under every temperature, the drop rates come to the fixed value with a lapse of time. Thus, the ECU 76 will control, based upon the temperature signal 272 and this lapse of time, to elongate the duration of injection time so that the shortage in the fuel amounts can be supplemented. In this regard, the lapse of time is measured by the ECU 76 per se.

Also, in the engine 34 of the outboard motor 31, the exhaust passages 182 (FIG. 1) are gathered to make the manifold collector sections 183. In addition, exhaust gases are discharged underwater through the exhaust pipes 184 and the expansion chamber 186 formed in the driveshaft housing 32. This exhaust system causes much back pressure therein and hence amounts of the induced air charge can be varied in every cylinder (the upper cylinder UC, middle cylinder MC and lower cylinder LC). The variations of the induced air charge amounts, then, bring variations of the combustion temperature and eventually the temperature of the injector nozzles 164 in each cylinder. This situation is shown in FIG. 19. At the engine speed of 4,000 rpm, the temperature of the upper cylinder UC is the highest because the combustion condition in the upper cylinder UC is the best with the longest exhaust length. In addition, since the exhaust passage of the lower cylinder LC is connected with the exhaust passage of the upper cylinder UC, the combustion condition of this cylinder LC is better than that of the middle cylinder MC. This temperature data are used for adjusting the supplemental amounts of the injected fuel for more accurate control.

Figure 20:
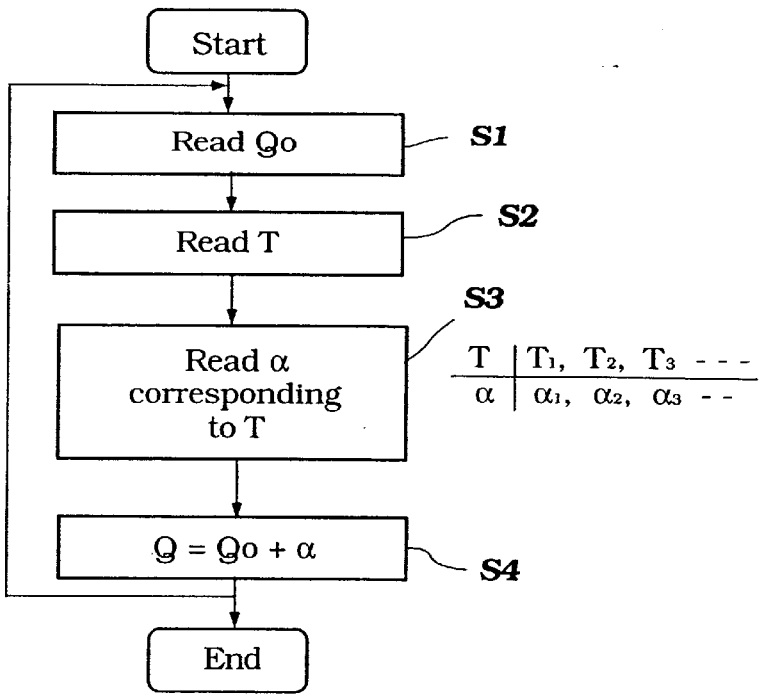
FIG. 20 is a diagram showing the control routine of a fifth embodiment of this invention, in which a control map that can be made from the relationships shown in FIGS. 18 and 19 is used.

FIG. 20 shows the fifth embodiment of this invention, that requires no temperature sensor. FIG. 20 illustrates a diagram showing a control routine by the ECU 76. Instead of the temperature sensor 271 in FIG. 17, this device uses a control map that is made from the graphs shown in FIGS. 18 and 19. The map is not shown because it is practicable for a skilled person in this art to make it in accordance with the principles of these graphs.

The routine starts and then moves to step S1 so as to read the present amount of fuel injection $Q_0$. Next, the routine moves to the step S2 to read a lapse of time T. Then, the routine moves to the step S3 to adjust the amount of the fuel injection. More specifically, in this step S3, the supplemental amount $\alpha$ corresponding to the lapse of time T in the control map is read. The routine, then, goes to the step S4 to determine the adjusted amount Q by adding the supplemental amount $\alpha$ to the present amount $Q_0$ ($Q=Q_0+\alpha$). This routine is repeated during the operation of the engine 34 and with the end of the engine operation the routine also ends. In this embodiment, the adjustments of the fuel amounts are actually done by elongating duration of the fuel injection.

As described above, even though heavy oil components could deposit on the injector nozzles 164, amounts of the fuel will be controlled correctly and good state of emissions can not be jeopardized.

Figure 21:
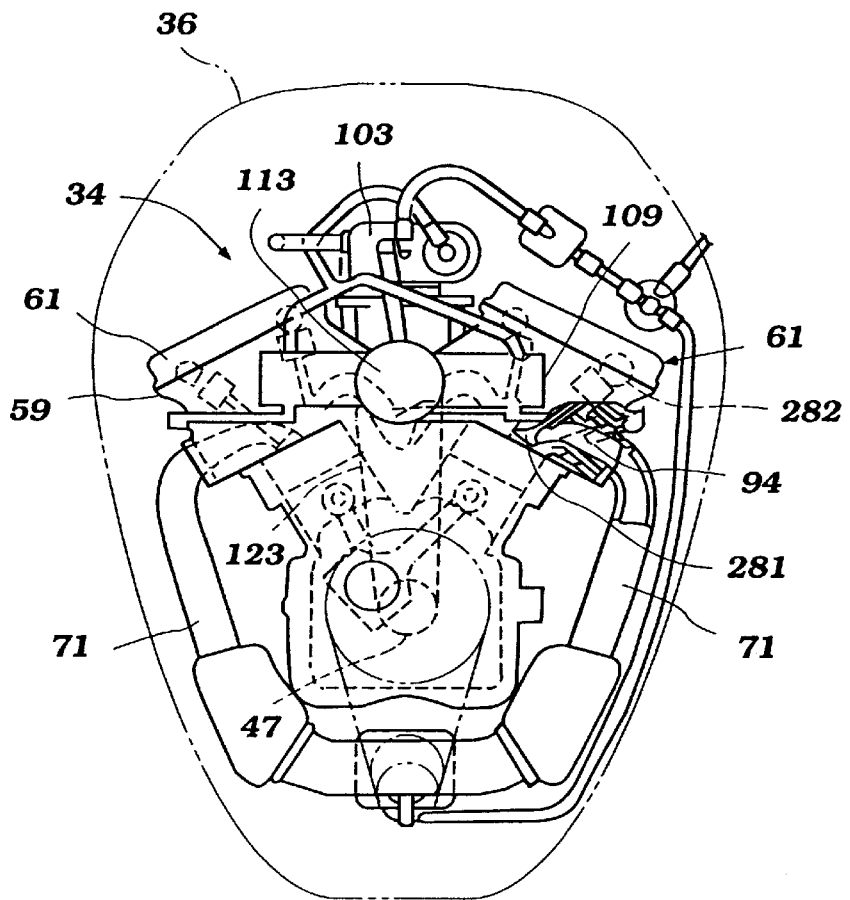
FIG. 21 is a plan view of an engine that operates on a four cycle principle and is capable to embody the features of this invention.

The features of this invention described above can be embodied in engines that operate on a four cycle principle. FIG. 21 illustrates a plan view of such an engine 34 that is accommodated in a protective cowling 36. Intake valves 282 and camshafts 283 that drive the intake valves 282 and exhaust valves (not shown) are provided therein.

It should be also noted that the features of this invention are also applicable not only to outboard motors but also to other various engines such as marine engines except for the outboard motors, lawn mower engines and stationary engines.

Of course, the foregoing description is that of preferred embodiments of the invention, and various changes and modifications may be made without departing from the spirit and scope of the invention, as defined by the appended claims.

What is claimed is:

1. A direct cylinder injected, internal combustion engine comprising a cylinder body defining at least one cylinder bore in which a piston reciprocates, a cylinder head affixed to an end of said cylinder body for closing said cylinder bore and defining with said piston and said cylinder bore a combustion chamber, a fuel injector spraying fuel directly into said combustion chamber for combustion therein, temperature sensing means for sensing the temperature of said fuel injector, and a control system receiving an input signal from the temperature sensing means and being electronically coupled to said fuel injection, the control system being configured to adjust the amount of the fuel that the fuel injector sprays into the combustion chamber based upon the input signal from said temperature sensing means.

2. The engine as set forth in claim 1, wherein said cylinder body comprises a plurality of vertically spaced, horizontally extending cylinder members, each combustion chamber is provided with a fuel injector and an associated temperature sensing means, and said control system adjusts the amount of the fuel sprayed into the combustion chambers in response to the outputs from said respective temperature sensing means.

3. The engine as set forth in claim 1, wherein said engine includes an induction system that communicates with a crankcase chamber of the engine.

4. The engine as set forth in claim 1 wherein said engine includes at least one intake valve that is disposed on the cylinder head to regulate air flow into the combustion chamber.

5. An internal combustion engine comprising an engine body, a movable member movable relative to the engine body, the engine body and the movable member together defining a combustion chamber, a fuel injector spraying fuel directly into the combustion chamber, the fuel injector having an injection nozzle, at least a portion of the injection nozzle being exposed to the combustion chamber, a temperature sensor disposed near the injection nozzle, and a control device coupled with the fuel injector and to the temperature sensor, the control device being configured to control an amount of fuel injected by the fuel injector, the control device adjusting the amount of the fuel based upon a signal from the temperature sensor.

6. The engine as set forth in claim 5, wherein the control device stores a plurality of adjustment amounts of the fuel corresponding to a plurality of time ranges, measures cumulative running time of the engine, and adjusts the amount of the fuel by using one of the adjustment amounts of the fuel that corresponds to the time range into which the measured cumulative running time falls.

* * * * *